(12) United States Patent
Finkel et al.

(10) Patent No.: US 11,699,196 B2
(45) Date of Patent: Jul. 11, 2023

(54) CREATING SECURE DATA IN AN OIL AND GAS SUPPLY CHAIN

(71) Applicant: SICPA HOLDING SA, Prilly (CH)

(72) Inventors: Charles Finkel, New York, NY (US); Mark Campbell, Lausanne (CH); Christophe Van Ngoc Ty, Geneva (CH); Giorgio Caset, Le Mont-sur-Lausanne (CH); Friedrich Koebler, Riaz (CH); Aksel Nielsen, Nyon (CH)

(73) Assignee: SICPA HOLDING SA, Prilly (CH)

( * ) Notice: Subject to any disclaimer, the term of this patent is extended or adjusted under 35 U.S.C. 154(b) by 266 days.

(21) Appl. No.: 15/530,164

(22) PCT Filed: Jun. 8, 2015

(86) PCT No.: PCT/US2015/034662
§ 371 (c)(1),
(2) Date: Dec. 8, 2016

(87) PCT Pub. No.: WO2015/191443
PCT Pub. Date: Dec. 17, 2015

(65) Prior Publication Data
US 2017/0124669 A1    May 4, 2017

(30) Foreign Application Priority Data
Jun. 9, 2014    (WO) ............... PCT/US2014/041579

(51) Int. Cl.
*G06Q 50/06*    (2012.01)
*G06F 21/44*    (2013.01)
(Continued)

(52) U.S. Cl.
CPC .............. *G06Q 50/06* (2013.01); *G06F 21/44* (2013.01); *G06F 21/64* (2013.01); *G06F 21/88* (2013.01);
(Continued)

(58) Field of Classification Search
CPC .. G06Q 10/10; G06Q 10/06315; G06Q 50/28; G06Q 20/40975; G06Q 10/00;
(Continued)

(56) References Cited

U.S. PATENT DOCUMENTS 7,424,399 B2    9/2008    Kahn et al.
7,830,273 B2    11/2010    Twitchell, Jr.
(Continued)

OTHER PUBLICATIONS

International Search Report and Written Opinion issued with respect to application No. PCT/US2015/034662.
(Continued)

*Primary Examiner* — Mehmet Yesildag
*Assistant Examiner* — Ayanna Minor
(74) *Attorney, Agent, or Firm* — Muncy, Geissler, Olds & Lowe, P.C.

(57) ABSTRACT

The present invention generally relates to a system and method creating secure data in a gas and oil supply chain. The system creates secure data related to oil and gas assets while traversing an oil and gas supply chain. At least one repository system(s), which collects secure data generated by capturing information using a secure observer device, sends the secure data to a gateway which is a part of a global management system or an integrity management system to create clustered events. The disclosure also relates to a system and method for managing and controlling data between entities in an oil and gas asset supply chain, and in (Continued)

particular to an excise tax management system and method to identify and reconcile tax filings, production volumes and operational reports.

19 Claims, 16 Drawing Sheets

(51) Int. Cl.

| | |
|---|---|
| *G06F 21/88* | (2013.01) |
| *G06F 21/64* | (2013.01) |
| *H04L 9/40* | (2022.01) |
| *G06K 7/10* | (2006.01) |
| *G06F 21/60* | (2013.01) |
| *G06Q 10/0631* | (2023.01) |
| *G06Q 40/10* | (2023.01) |

(52) U.S. Cl.
CPC ... *G06K 7/10722* (2013.01); *G06Q 10/06315* (2013.01); *G06Q 40/10* (2013.01); *H04L 63/12* (2013.01); *G06F 21/602* (2013.01)

(58) Field of Classification Search
CPC ........ G06Q 50/60; G06Q 50/06; G06Q 40/10; G01Q 50/60; G06F 15/16; G06F 17/00; G06F 17/20; G06F 21/602; G06F 21/44; G06F 21/64; G06F 21/88; G06K 19/00; G06K 7/10722; H04L 63/12; G05B 2219/25205; G05B 2219/36542; G05B 2219/24163; G08B 21/0275; B65H 2553/52; A63F 2300/401; A63F 2300/532
See application file for complete search history.

(56) References Cited

U.S. PATENT DOCUMENTS

| | | | |
|---|---|---|---|
| 8,676,721 | B2 | 3/2014 | Piovesan et al. |
| 8,681,000 | B2 | 3/2014 | August et al. |
| 2004/0248307 | A1* | 12/2004 | Grof .................. G01N 33/2882 |
| | | | 422/62 |
| 2004/0267464 | A1* | 12/2004 | Umekage ................ G01P 5/245 |
| | | | 702/48 |
| 2008/0270162 | A1* | 10/2008 | Machacek .......... G05B 23/0221 |
| | | | 702/182 |
| 2010/0019026 | A1* | 1/2010 | Hochfield .............. G06Q 10/08 |
| | | | 235/375 |
| 2012/0158610 | A1 | 6/2012 | Botvinick et al. |
| 2012/0254058 | A1* | 10/2012 | Walker .................. G06Q 10/08 |
| | | | 705/333 |
| 2013/0262330 | A1 | 10/2013 | Sannier et al. |
| 2013/0299591 | A1* | 11/2013 | Marka .................... G06K 19/00 |
| | | | 235/491 |
| 2014/0136218 | A1 | 5/2014 | Bolene et al. |
| 2016/0214852 | A1* | 7/2016 | Collins .................. B67D 7/222 |

OTHER PUBLICATIONS

Eurasia office action in counterpart Eurasian Application No. 201591358/31 dated Oct. 27, 2016 (and English language translation).
Mexican Office Action in counterpart Mexican Application No. MX/a/2015/008903 dated Nov. 8, 2018 (and English language translation of the Office Action).
Indian Office Action (First Examination Report) in counterpart Indian Application No. 201617042847 dated Jul. 20, 2020.

* cited by examiner

"Event Sequence"

"Weak probability"

"Event Sequence"

"Medium probability"

"Event Sequence"

"High probability"

"Event Sequence"

ation No. PCT/US2014/041579 filed Jun. 9, 2014, the
CREATING SECURE DATA IN AN OIL AND GAS SUPPLY CHAIN

CROSS-REFERENCE TO RELATED APPLICATIONS

The present application claims priority to International Application No. PCT/US2014/041579 filed Jun. 9, 2014, the disclosure of which is expressly incorporated by reference herein in its entirety.

FIELD OF THE DISCLOSURE

The present invention generally relates to a system and method creating secure and reliable data in a gas and oil supply chain.

BACKGROUND INFORMATION

Supply chain management is a difficult problem for organizations that regularly conduct business in the transportation of a large number of products over a large geographic area. The ability to track and trace goods, items or assets over the supply chain is difficult enough, much less the added pressures of determining or validating whether a specific good, items or assets are counterfeit, diverted or adultered. Currently, systems exist in which goods, items or assets may be collected and distributed in which location and status information regarding the movement of the goods items or assets is monitored throughout the supply chain.

The oil and gas industry is typically divided into three sectors: upstream, midstream and downstream, as illustrated in FIG. 2. The oil and gas industry is typically divided into three sectors: upstream, midstream and downstream. The upstream sector is known as the exploration and production sector. The upstream sector includes the searching and exploration for potential underground or underwater crude oil and natural gas fields (e.g. identification of potential hydrocarbon reserves), drilling of exploratory wells, and subsequently drilling and completion of the wells that recover and bring (produce) the crude oil and/or raw natural gas to the surface. The midstream sector involves the transportation (by pipeline, rail, truck, etc.), storage, and wholesale marketing of crude or refined petroleum products. Pipelines and other numerous transport systems can be used to move crude oil from production sites to refineries and deliver the various refined products to downstream distributors. The downstream sector refers to the refining of petroleum crude oil and the processing and purifying of raw natural gas, as well as the marketing and distribution of products derived from crude oil and natural gas. The downstream sector provides consumers with products such as gasoline or petrol, kerosene, jet fuel, diesel oil, heating, oil, lubricants, waxes, asphalt, natural gas, and liquefied petroleum gas as well as hundreds of petrochemicals.

In recent years, there has been a major increase of illegal activities related to oil and gas assets. For example, the number of oil and gas thefts in areas such as Texas and Mexico has increased nearly ten times in the past ten years. Corruption, theft, tampering, stealing and other such illegal activities occur along all phases and sectors of supply chain, including upstream, midstream and downstream. Pipeline taps, crude oil diversion, trucking hijacks, underground tunnels and stealing oil in refineries are just a few examples of the types of illegal activities that have become too prevalent within the industry. With this uptick in activity, there are several challenges faced by the oil and gas industry. For example, events that occur are not always related to one another geographically or otherwise, and provide a chain of fragmented events and incidents. Currently, many different solutions and technologies exist to assist in management, but they are not homogenous or compatible systems. A lack of coordinated communication and transparency among regions, functions and teams provides various challenges, and a lack of recordability and traceability of events stymies accountability. Thus, it becomes difficult to respond to such events and incidents in a timely manner, if at all.

As such, there exists a need to provide an intelligent management system that can address the need of monitoring and reporting or alerting illegal activities on oil and gas assets while at the same time increasing reliability, safety, regulatory compliance and environmental responsibility. Additionally, there is a need for a system that remotely monitors and prescriptively and predictively analyzes events of the assets that occur in the upstream, midstream and downstream sectors by monitoring, predicting, and providing data as an alert to allow for decision making from any location. Additionally, there is a need to secure data derived from goods or items or sensors, which are reliable and secure and will be used efficiently to protect the items or goods in the oil and gas supply chain. Additionally, there is a need for a system that allows addition of secure and accurate and reliable data from the upstream, midstream and downstream sectors which allow an efficient collection of the taxes along the supply chain, and allow at the state level to correctly recover the amount of tax that should be paid by the actors involved in the oil and gas supply chain. The term asset, as defined herein, includes all oil and gas products and infrastructure.

SUMMARY OF THE DISCLOSURE

The present disclosure, through one or more of its various aspects, embodiments, and/or specific features or sub-components, provides various systems, servers, methods, media, and programs for interfacing compiled codes, such as, for example, Java or data mining algorithms or mix of hardware and software elements to generate data with additional attributes useful in a Global management system (GMS) or in an Integrity Management System (IMS) related to management of oil and gas assets.

In one embodiment, there is a system for creating secure data related to oil and gas assets while traversing a supply chain, including at least one repository system(s) which collects secure data generated by capturing information using a secure observer device, and sends the secure data to a gateway and/or data integration module which is a part of a global management system or an integrity management system to create clustered events.

In another embodiment, there is method for creating secure data related to oil and gas assets while traversing a supply chain, including collecting secure data, in at least one repository system(s), generated by capturing information using a secure observer device, and sending the secure data to a gateway and/or data integration module which is a part of a global management system or an integrity management system.

In still another embodiment, there is a non-transitory computer readable medium storing a program to create secure data related to oil and gas assets while traversing a-gas supply chain, the program when executed by a processor, including collecting secure data, in at least one repository system(s), generated by capturing information using a secure observer device, and sending the secure data to a gateway and/or data integration module which is a part of a global management system or an integrity management system to create clustered events or secure and reliable tax report or KPI useful for tax recovery, tax reconciliation, correcting asymmetries of data provided from different entities along the oil and gas supply chain.

In one aspect, an event management platform to obtains supply chain visibility using the collected secure data to identify at least one of tampering, diversion, adulteration, counterfeiting, fraud and tax fraud of a product in the supply chain.

In another aspect, the repository system communicates with the event management platform via a network and includes a plurality of storage devices accessible by and distributed among the system.

In still another aspect, a standard observer device is configured to capture standard information of a product from a first product identifier, the captured information thereby forming standard data, and the secure observer device is configured to capture the standard information of the product from the first product identifier and secure information from a marking, the captured information thereby forming the secure data.

In yet another aspect, the marking includes a composition having compounds with luminescent properties in the range of at least one of UV, IR and Near IR and mixtures thereof which may represent a chemical key.

In another aspect, the first product identifier is linked to the authenticator.

In one other aspect, when the secure observer device captures the standard information and the secure information, the secure data is sent to the repository system, and when the standard observer device captures the standard information, the standard data is sent to the repository system.

In another aspect, the product is one of gasoline or petrol, kerosene, jet fuel, diesel oil, heating, oil, lubricants, waxes, asphalt, natural gas, liquefied petroleum gas and petrochemicals.

In still another aspect, the repository system stores the standard data linked to the product during a life cycle of the product in the supply chain, the standard data in the form of data representative of the first product identifier.

In one aspect, the standard and secure observer device is at least one sensor provided along the supply chain to capture secure information.

In yet another aspect, the sensor senses data including or related to at least one of temperature, density, humidity, volume, gravity, chemical composition, pressure, weight, pressure variation of a pipeline, difference in weight of a vehicle or fuel volume, GPS localization, timing of a vehicle location, geographical region, flow rate, conductivity, rheology, turbidity, imaging, thermal imaging, sensor status, strain gauges, weather related data, traffic, vehicle or road condition, wind speed, barometric conditions, rainfall, maintenance data or maintenance date, personal position information, RF data, acoustic data, viscosity and GPS position.

In still another aspect, the repository system stores the standard data and the secure data which are linked to the product during a life cycle of the item in the supply chain, the standard data in the form of data representative of the first product identifier and the secure data in the form of data representative of the marking.

In yet another aspect, the standard data and the secure data are captured simultaneously by the secure observer device.

In another aspect, the product is marked with the first product identifier and the marking.

In still another aspect, the information captured by the secured observer device is from sensors in at least one of the pipelines along the oil and gas supply chain, a chemical marking the product, and attached to a pump in a gas station which distributes the product.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
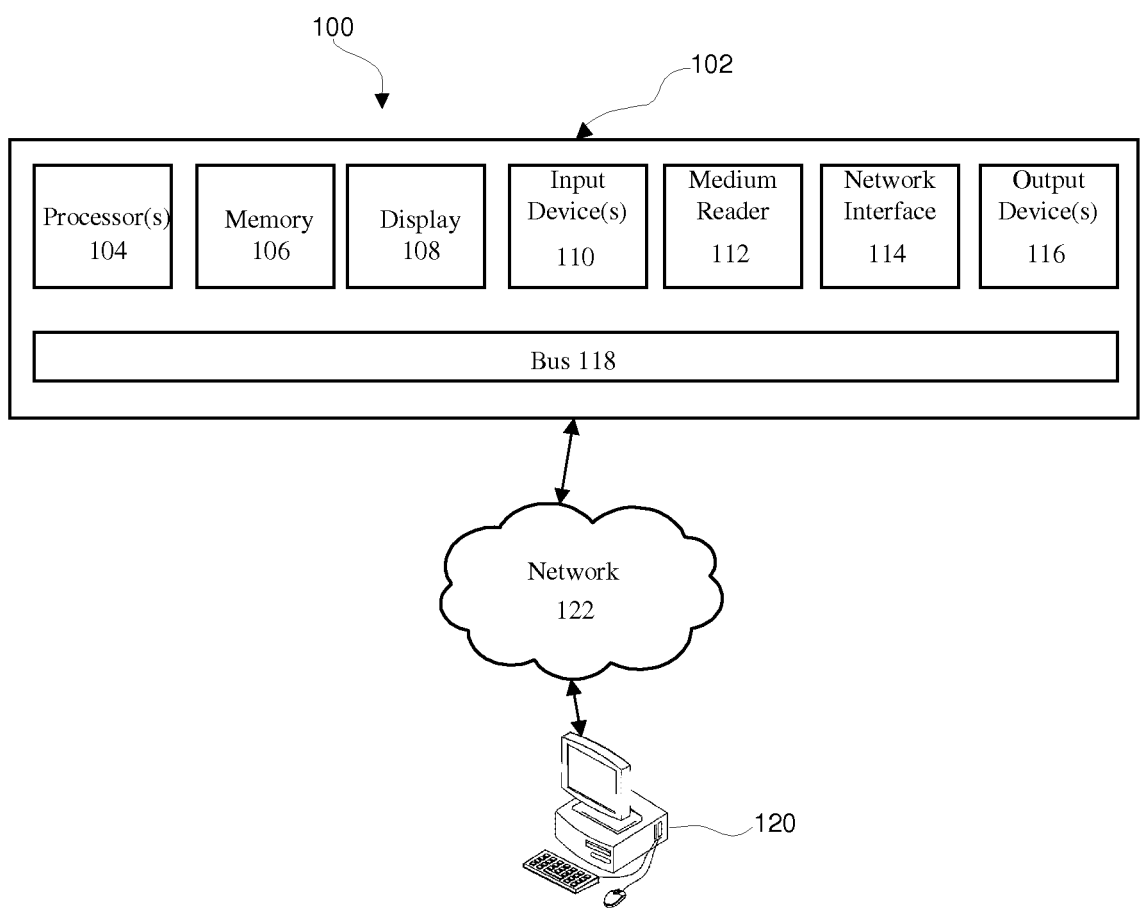
FIG. 1 is an exemplary system for use in accordance with the embodiments described herein.
Figure 2:
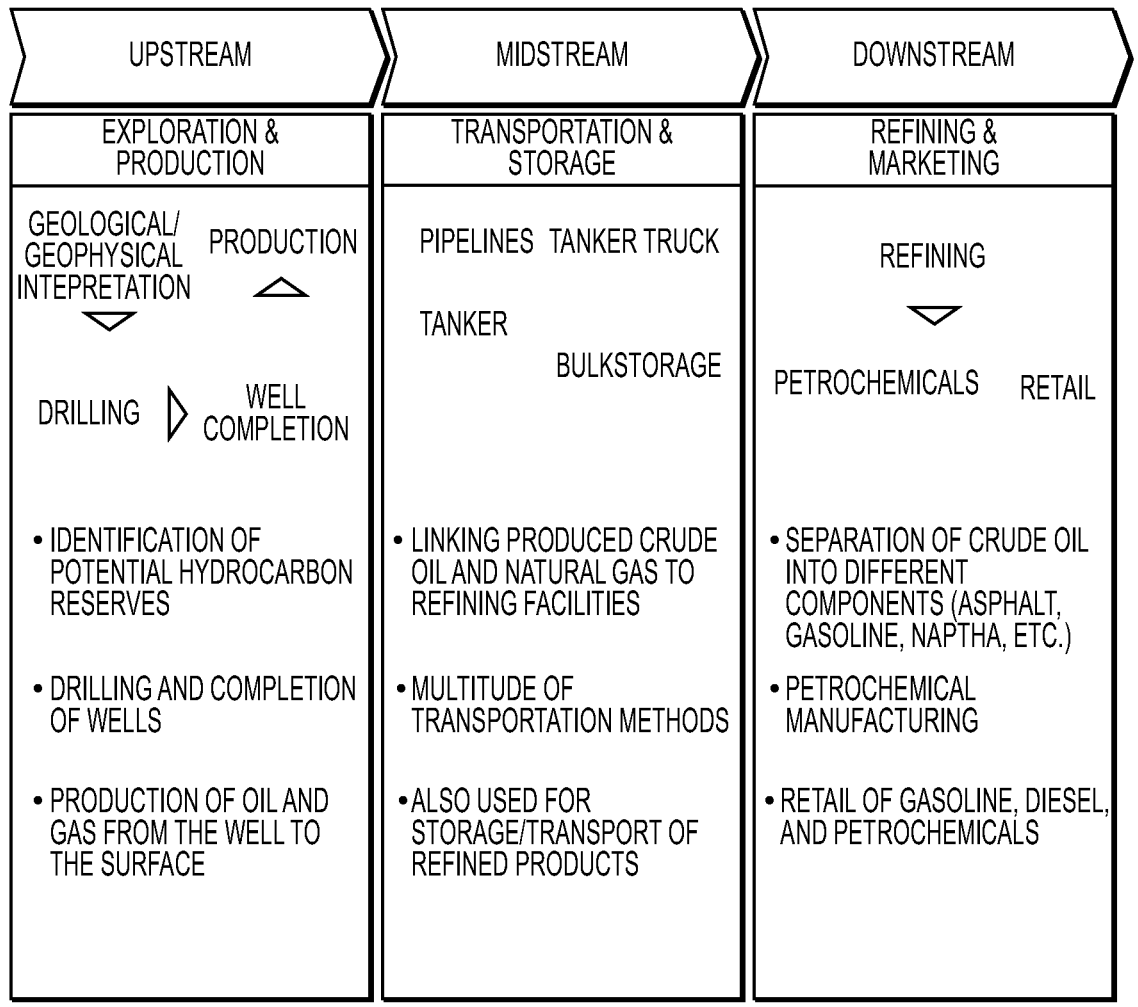
FIG. 2 is an exemplary supply chain for use in the oil and gas industry.
Figure 3:
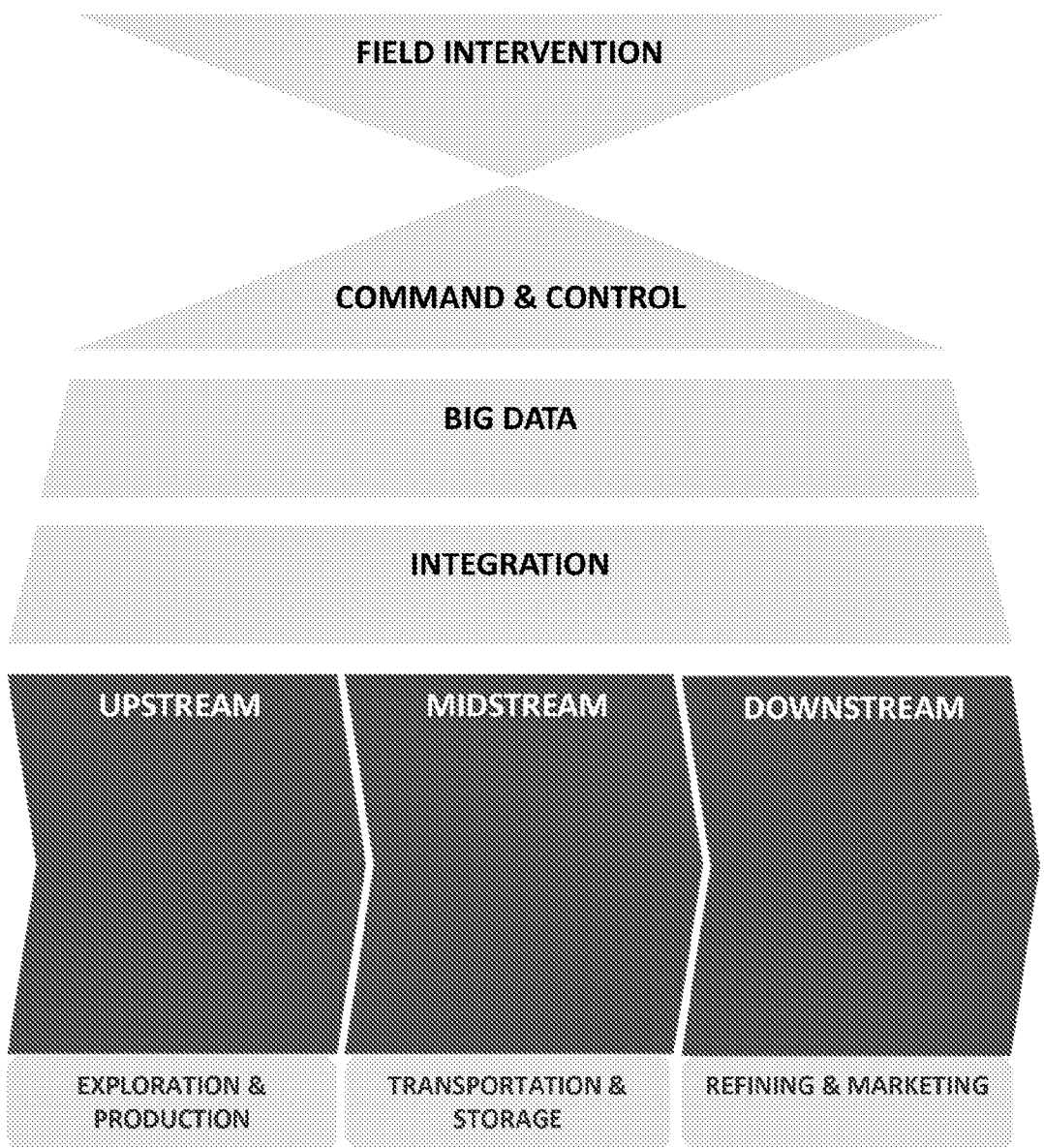
FIG. 3 is another exemplary diagram of an integrity management system in accordance with an embodiment of the disclosure.

FIG. 1 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, additional embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display. The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 4:
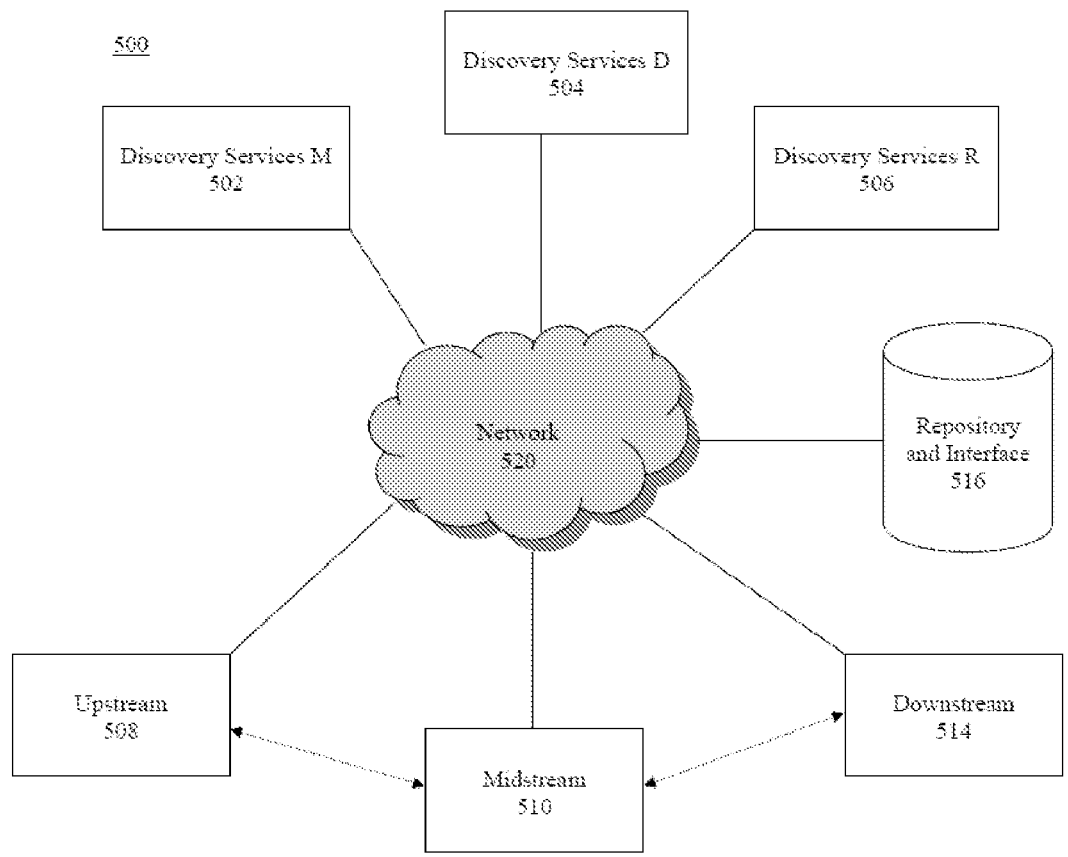
FIG. 4 is an exemplary of supply chain network in accordance with an embodiment of the disclosure.

FIG. 4 illustrates an exemplary supply chain network. The system 500 includes, for example, upstream 508, midstream 510, downstream 514, a repository and interface 516 and discovery services 502, 504 and 506 over which the different components of the system 500 communicate through a network 520, such as the Internet. The discovery services 502, 504 and 506 include a database (and interfaces) to promote data exchange by offering a service that links information about products and assets (e.g. oil and fuel) as they move, for example, through a supply chain from upstream 508, to midstream 510 and to downstream 514. As product passes through the supply chain and is registered by data capture devices at each of the sectors 508, 510 and 514 (as described above), captured data in the form of standard or secure events are sent to the appropriate discovery service. This allows for monitoring of the products as it traverse the supply chain, and generates events (standard or secure) as it occurs in real-time.

More specifically, each product or asset or data being tracked along the oil and gas supply chain includes at least one product identifier and authenticator. It is appreciated that the term product, as used herein, may include or be replaced with the any combination of the terms asset and data. That is, products, assets and data may each traverse the supply chain. Any reference to one term equally may include reference to the other, even where not explicitly stated. As explained, a data capture device (e.g. sensor, camera, etc.) may be used to identify a product identifier and authenticator when one of several events occurs. These events may include, but are not limited to, search and explore, refining, flow in a pipeline, transport by truck, etc. For example, when a product is sent from a distributor to a retailer, a sensor or a data collector (e.g. manual reporting) at the distributor indicates that the product is leaving and this information is forwarded to a corresponding recipient service (e.g. retail, gas station if the product is fuel, and when the product reaches the retailer, another sensor or a data collector indicates the product has arrived and this information is stored in a corresponding discovery service. It is appreciated that data may also be "captured" using a variety of techniques. For example, there could be manual reporting of data and shipments or some grouping of data. In one example, one event would indicate that the product had been loaded onto Truck #N. Another data would indicate the GPS position of Truck #N showing that it was leaving. Then it would be inferred that the product is leaving. An added layer of protection and security is provided using the repository and interface 516, which, as described, stores a product identifier and authenticator that is linked or associated with a corresponding product. The product identifier and authenticator provide an added level of security because only a sensor (data capture device) that is specifically designed to read the product identifier and authenticator can verify a corresponding product on which it is placed. This added level of security greatly reduces the likelihood of counterfeit goods and tampering from entering the supply chain and allows inside the system to have secure and accurate data as possible, use after in the data integration or data management system part of GMS or IMS.

A brief explanation of the process involving the various entities of FIG. 4 is described. The process starts, for example, with an item passing through a supply chain, from the upstream 508 through the midstream 510 to the downstream 514. Custody of the product is registered along the supply chain with the respective discovery service (which may be the same or different services). In some embodiments, the registration occurs when an event is captured about the product. That is, when a specified event occurs, the event associated with the product is posted to the discovery service. This information is also reported and stored in repository and interface 514. The repository and interface 514 can validate the authenticity of the product based on the product identifier and authenticator (e.g. marking) information having been previously captured and stored therein.

Figure 5:
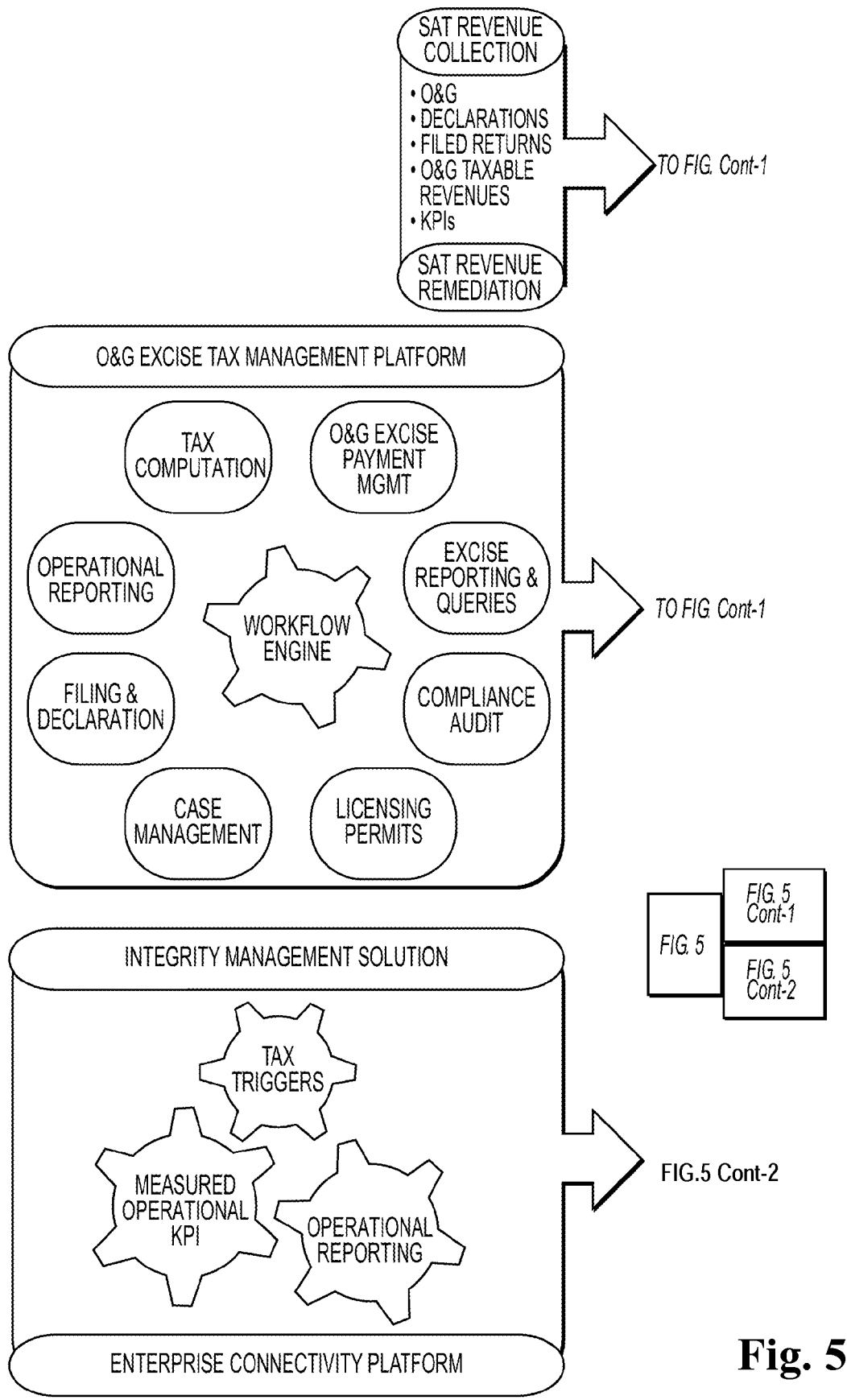
FIG. 5 is an exemplary diagram of an integrity management system which interfaces with an excise remediation platform through an excise platform interface in accordance with an embodiment of the disclosure.
Figure 5:
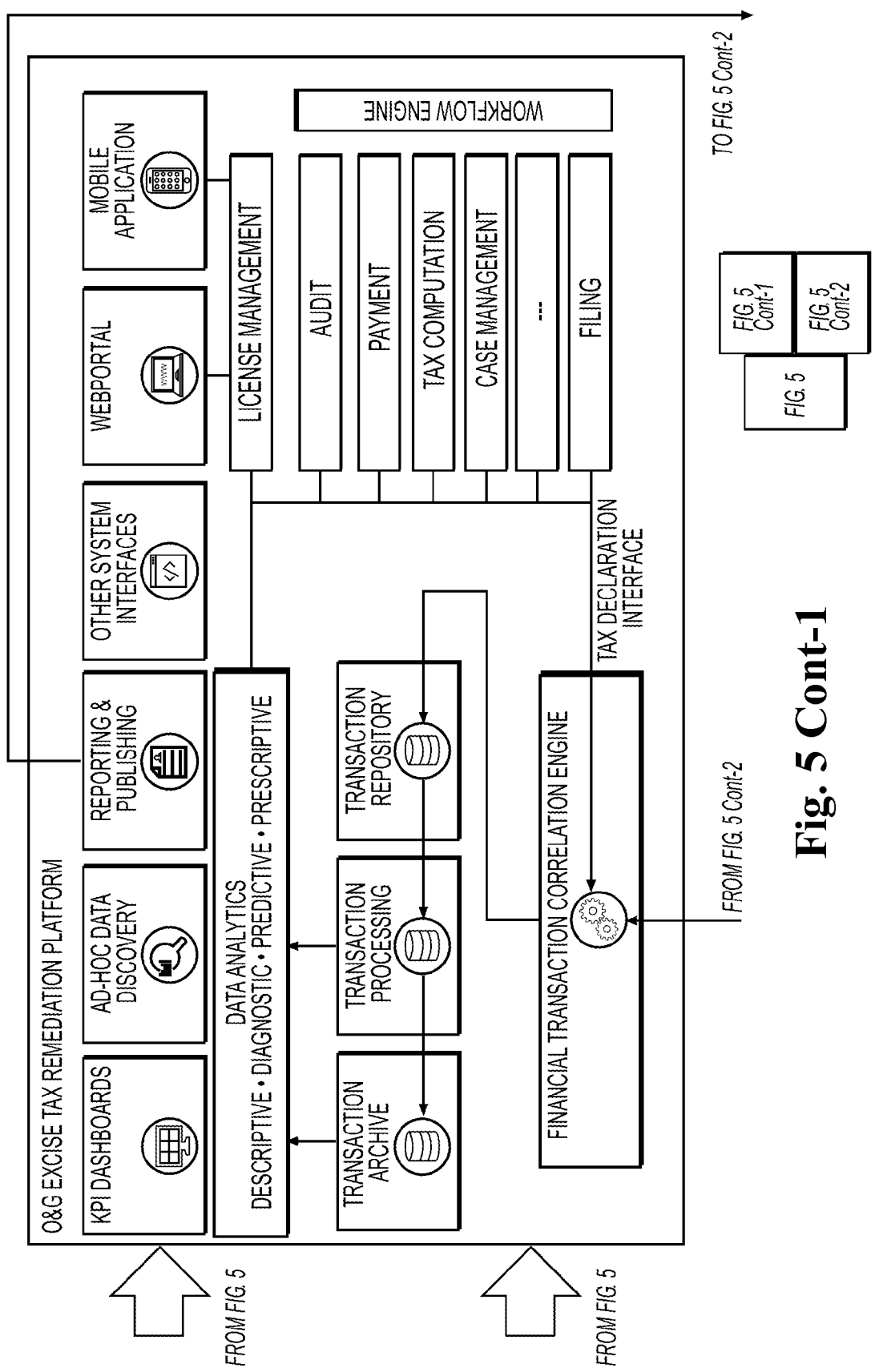
Figure 5:
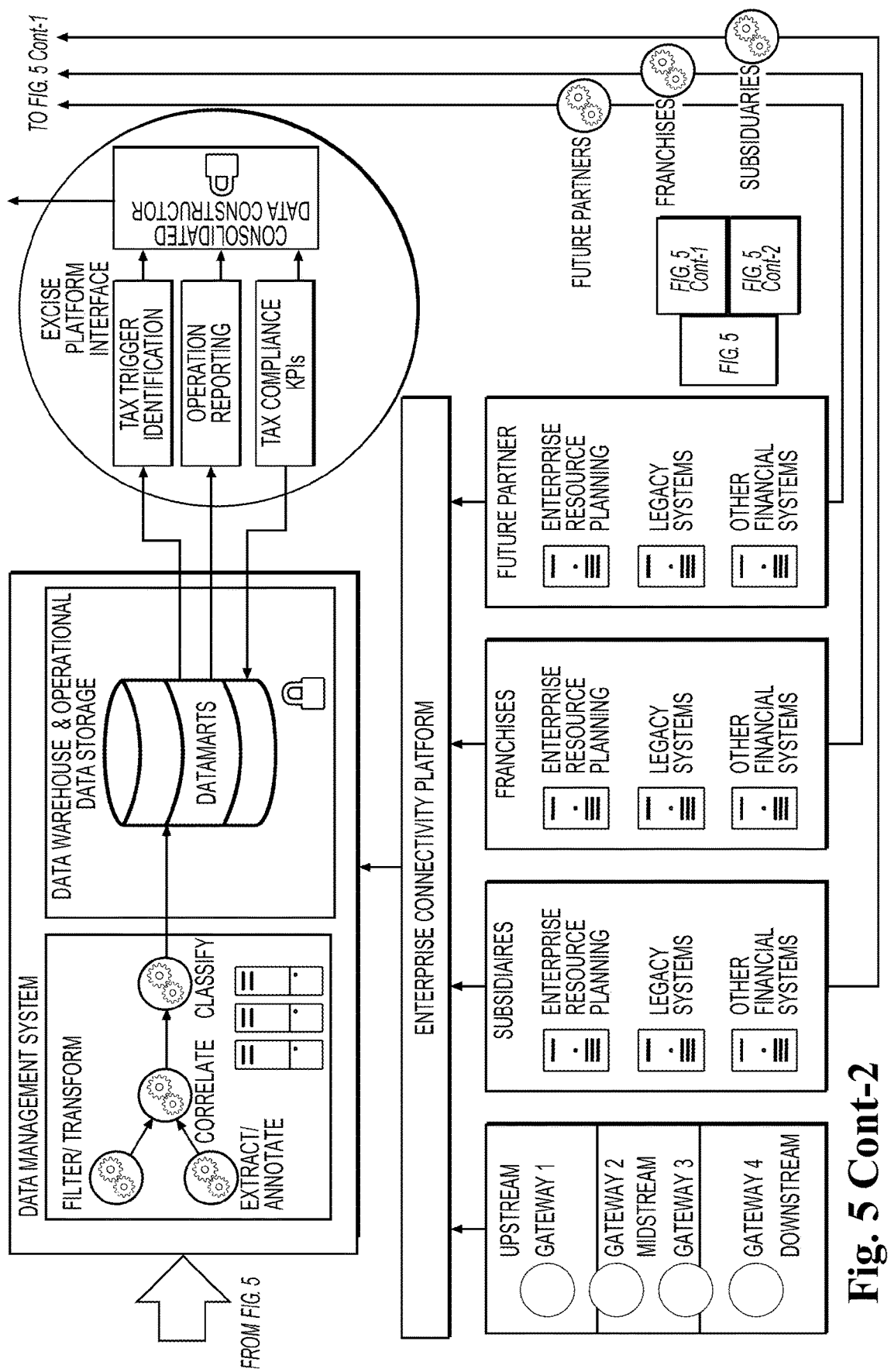

FIG. 5 is an exemplary diagram of an integrity management system in accordance with an embodiment of the disclosure. The integrity management system IMS includes, but is not limited to, which interfaces with an excise tax remediation platform via an excise platform interface (said platform is mainly software based platform), a data management system DMS, a data integration module (or enterprise connectivity platform), a gateway interface, and sensors or data collectors used for capturing data from upstream, midstream and downstream, along with various systems storing and providing data from future partners, franchises and subsidiaries of a corporate entity (not shown). The integrity management system IMS may also include or extend to external resources, field and resource management, predictive and prescriptive applications, evidence based event management and existing legacy systems. It is appreciated that the integrity management system IMS is not limited to the disclosed components, nor must it include each of the components illustrated in the non-limiting and exemplary embodiment. For example, a supervisory control and data acquisition (ICS such as SCADA) system may replace the collection of data instead of the gateway interface. As noted above, data may be stored in a single repository or multiple repositories. Gateway could also be drones having the same capabilities that a fixed gateway interfacing with supervisory control and data acquisition and that will collected the information directly from the sensors or data collectors at upstream, downstream and midstream level.

The integrity management system IMS manages and controls or interfaces with at least one entity in an oil and gas asset supply chain. The entity may include, but is not limited to, a corporate entity, future partners, franchises, subsidiaries and/or a tax administrative entity. An excise tax management system and method to identify and reconcile asymmetries between tax filings, production volumes and operational reports from the various entities. The integrity management system IMS collects the heterogeneous, unstructured and fragmented data from sensors, data collectors and monitoring sub-systems in the upstream, midstream and downstream oil and gas infrastructure (pipelines), to store and process the collected data using knowledge of the oil and gas infrastructure systems. Data is also collected via the subsidiaries, franchises and future partners, enterprise resources planning or other financial management systems such as legacy customer developed applications. The data collected from the subsidiaries, franchises and future partners may include, for example, an invoice, payment and cash management data. The data is structured for additional processing and analysis, and the integrity of the structured data is verified and secured to prevent tampering. Eventually, the data is sent to the data management system DMS, in another embodiment, for filtering/transforming, extracting/annotating, correlating, reconciling, classifying and storing.

More specifically, collected data will be acquired and processed in real-time and routed to the data management system DMS. The data management system DMS, in this embodiment, includes a filtering and transforming module, an extraction/annotation module, a correlation module and a classification module. Also provided in the data management system DMS is a data warehouse and operational data storage. The data management system DMS is responsible for filtering and transforming the data collected and captured by the sensors, collectors, subsidiary, franchise and/or future partners (which may be secured and clustered); extracting and annotating the filtered and transformed data; correlating the extracted and annotated data; and classifying the correlated data. The classified data is then sent to a data warehouse and operational data storage for storage.

The data management system DMS is also responsible for managing (and storing) data stored in its data warehouse and operational data storage to the excise platform interface. The excise platform interface includes, for example, a tax trigger identification module, an operation reporting module, a tax compliance KPI module and a consolidated data constructor module. The excise platform interfaces between the data management system DMS and the excise tax remediation platform. The excise platform interface computes and formats excise tax estimates based on a wide variety of data, including volumetric operational and financial data. The computed and formatted data is identified as a taxable transaction for later reconciliation, and feedback of tax related KPIs are sent to a KPI dashboard (described below) in the excise tax remediation platform. In particular, the excise platform interface identifies taxable transactions for reconciliation in the tax identification module, computes and formats data in the operation reporting module, provides feedback of the formatted data in the tax compliance module and consolidates the data output from the tax identification module, the operation reporting module and the tax compliance module in the data constructor module. Additionally, the excise platform interface receives the data (which may be secured and clustered) generated by the data management system DMS, thereby enabling an entity to compare and reconcile at least one of excise tax, tax collection and the KPI generated by another(other) entity(ies). This interface enables the integrity management system IMS to provide a built-in cross-checking and reconciliation of tax related data between independent sources of reporting. Ultimately, this affords tax payment transparency such that fraudulent activities can be minimized. As example, the tax KPIs and related tax data are complex data and should be adapted in almost real time according to specific rules provided by the state tax rules. For example, if the volume of oil sold is 5,000 barrels, the tax value could be 5 percent. When the volume of oil sold is 500,000 barrels, the tax value is only 3 percent. The tax remediation platform maintains all rules to treat the data provided by the DMS and related to tax so as to generate, based on the provided rules, the corresponding taxes that should be paid. Another example occurs downstream where a gas station would declare an amount of sales in dollars which does not correspond to the volume of product distributed to the location.

The excise tax remediation platform which is interfaced with the IMS includes, but is not limited to, a financial transaction correlation engine, data analytics (for example, descriptive, diagnostic, predictive and prescriptive), a KPI or reporting dashboard, ad-hoc data discovery, reporting and publishing module, other system interface module, a web portal, mobile applications, a workflow engine, a transaction archive, transaction processing and a transaction repository. The excise tax remediation platform receives the consolidated data from the excise platform interface (which has received secure and accurate tax related data from the DMS part of the IMS) to identify and reconcile asymmetries between the consolidated data automatically generated by the excise platform interface and a corresponding tax declaration independently or manually generated (e.g. at subsidiaries level or corporate level or any entity involved in oil and gas supply chain). The excise tax remediation platform also has a transaction repository storing the identified and reconciled data from the correlation engine, a transaction processor to link the identified and reconciled data, a transaction archive storing archived identified and reconciled data from the correlation engine; and a data analytics module receiving processed and archived data for descriptive, diagnostic, predictive and prescriptive analysis. The data sent to the data analytics module may be entered into a prediction and prescriptive analysis module (predictive and prescriptive application) that uses machine learning to identify sequences of measurements (FIG. 8A) or computed data that are classified as "events" that require some form of action and/or reporting. The classification of an event, previously supplied by the data management system, can be confirmed (by a human operator or machine) and the results sent to the prediction and prescription module to improve the training set for the learning algorithm, allowing it to "learn" over the course of time. Using machine learning, the integrity management system IMS will learn which series of event measurements taken together will indicate that a certain event or cluster of events has occurred. Using the "learned" events, the system is able to utilize historical data and improve accuracy over time. Tax reports from the tax excise remediation platform will provide oil and gas subsidiaries, partners and franchises which could include information about past declarations, their consolidations and future projections. Accordingly, the excise tax remediation platform allows for tax management with a front-end for taxpayer access, a unified tax filing and production volume repository and reconciliation, built in data analytics and a reporting dashboard for tax administration, an integrated and centralized system for oil and gas excise tax management and recovery, and identification and reconciliation of asymmetries between tax filings, production volumes and operational reports thereby providing efficient excise tax recovery. More specifically, in one embodiment, at the stage of the tax reconciliation, the system is automatically double checking a manual declaration with data automatically captured (and transformed in a secure manner and use to create useful clustered tax related data able to create secure and valid tax declaration for verification purposes). It is important to note, that one particular advantage of the IMS according to the present invention when interfacing with the tax remediation platform via the tax excise platform, is the quality of the data provided to said excise platform. The IMS will not only securely collect data from various sources, but will create secure and accurate data, which will be useful to create secure and reliable clustered data and report, useful for efficient tax recollection and correct asymmetries in the oil and gas supply chain. The IMS has also the advantage to allow at the corporate level to efficiently monitor the activity of all actors in the supply chain (subsidiaries, franchises etc.) and can manage them efficiently. All the secure collected data provided by the IMS to the corporate level will be useful to create secure and reliable report and KPI to efficiently compare with those provided at subsidiaries level or franchises level. By comparing reliable and secure report provided by the IMS at the corporate level with those from subsidiaries and franchises, an efficient management inside the supply chain of oil and gas will allow the corporate level to have a better visibility of what is wrong or not efficient and how to correct asymmetries on the oil and gas supply chain.

Figure 6A:
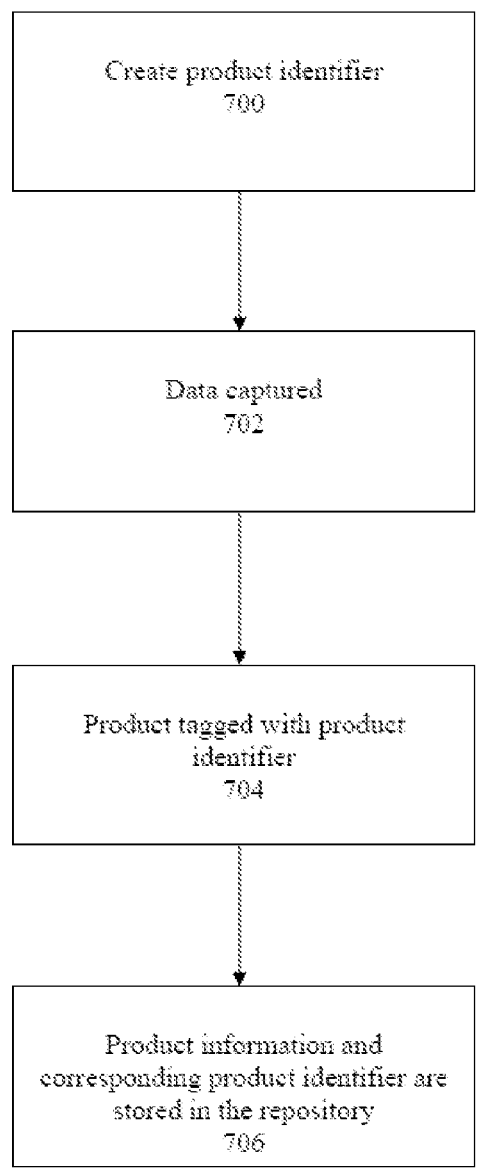
FIGS. 6A-6B illustrates exemplary flow diagrams of coding and tagging an object and of event tracking and authentication in accordance with the system.
Figure 6B:
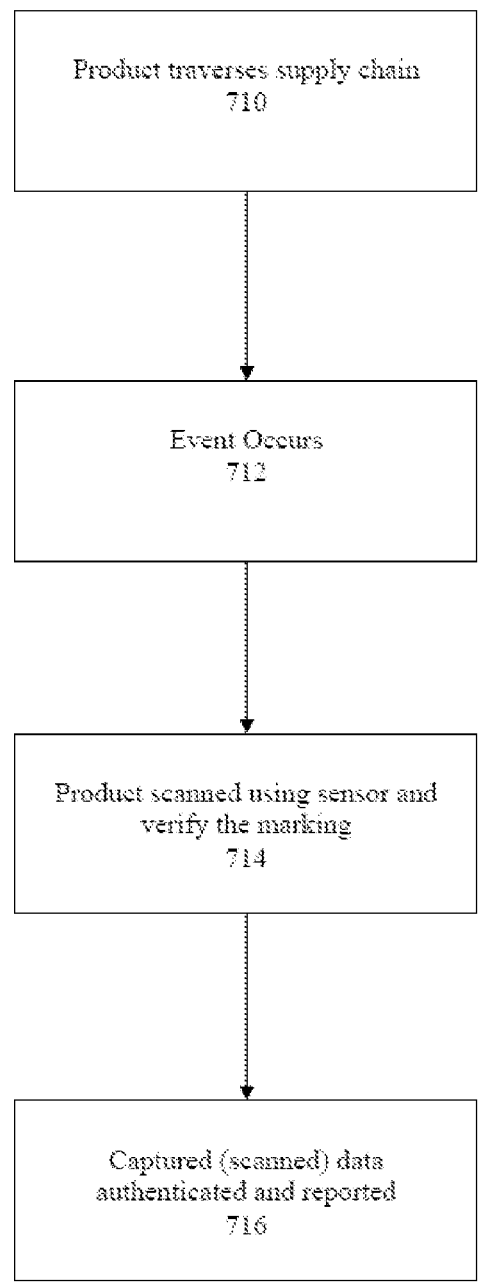

FIG. 6A illustrates an exemplary flow diagram of marking a product in accordance with the system. At 700, a product identifier is created using the techniques described above. The product identifier is captured in a repository of information at 702, and the product is marked with the product identifier at 704. At 706, asset (product) information and the corresponding product identifier are stored together in the repository and associated for later use, for example to later authenticate the product as it traverses a supply chain. FIG. 6B illustrates an exemplary flow diagram of event tracking and authentication in accordance with the system. At 710, a product travels along a supply chain, making several stops at various sectors (e.g. upstream, midstream and downstream). At each of the sectors, when a specified event occurs (712), the product is identified with a data capture device (e.g. sensor). The data capture device, as explained, identifies the product identifier (marking) at 714 and the captured information is reported for later authentication at 716. Commercially available or non-secure data capture devices (i.e. a device not capable of reading a secure event (as defined below)) read the product marking such that the event verification does not include authentication using the secure object identifier or authenticator. A secure data capture device, on the other hand, is an authenticated and dedicated device that reads the product marking such that the secure object identifier or authenticator of the product can be identified and used to validate and authenticate the product along the supply chain. Identifying and authenticating a product when an event occurs in this regard is termed a secure event. That is, the event having caused the information to be posted to the system is "secure" by virtue of the fact that the data capture device is able to identify and verify that the secure product identifier or authenticator is properly associated with the product. For example, the secure object identifier or authenticator may be a marking in the asset that is identified and linked to the event.

An example of the process described in FIGS. 6A and 6B is now described. The supply chain includes "partners" in three different sectors, an upstream partner, a midstream partner and a downstream partner. The upstream partner posts an event to the discovery server that indicates a product will be searched and explored into the supply chain. When the upstream partner has completed manufacturing the product into a sustainable product (e.g. oil or fuel), the product is tagged with a product identifier and authenticator. The product identifier and authenticator corresponding to the product(s) is stored in a repository, and another event is created and posted to the discovery server indicating that the product has been completed and is being transferred to the midstream partner. Once received at the midstream partner, the product is scanned by a secure observer device (e.g. sensor) to verify and authenticate the product using the product identifier and authenticator, and the midstream partner passes the product along to the downstream partner. Another event is posted to the discovery server indicating that the midstream partner has shipped the product to a downstream partner. Once received at the downstream partner, a further event is posted to the discovery server indicating that the product has been received, and once again the product may be verified and authenticated along the supply chain by identifying the product identifier and authenticator using a secure observer device (e.g. sensor).

The events posted and stored in the discovery server, which may be the same or different discovery servers, are viewable by the partners in the supply chain using known techniques such as a database of events, queues and logging tables. Events may be formed in a wide variety of classes depending on the product traversing the supply chain. Notification and messages may also be provided to partners using secure web reporting, sending alarm notifications and sending messages via email, SMS, or using any other means known to the skilled artisan. When a partner wishes to authenticate and verify a product, a query can be made to the system via the serialization and interface platform, discussed hereinabove. In addition to typical information such as event type, event date, partner name, etc., the partner may also request or automatically have delivered information regarding the authenticity of the product (assuming a secure observer device is used to read the product identifier and authenticator). In this regard, the product may be matched against information stored in the serialization and interface platform. If it is determined that a match has been found, then the product may be verified, as described above.

Figure 7:
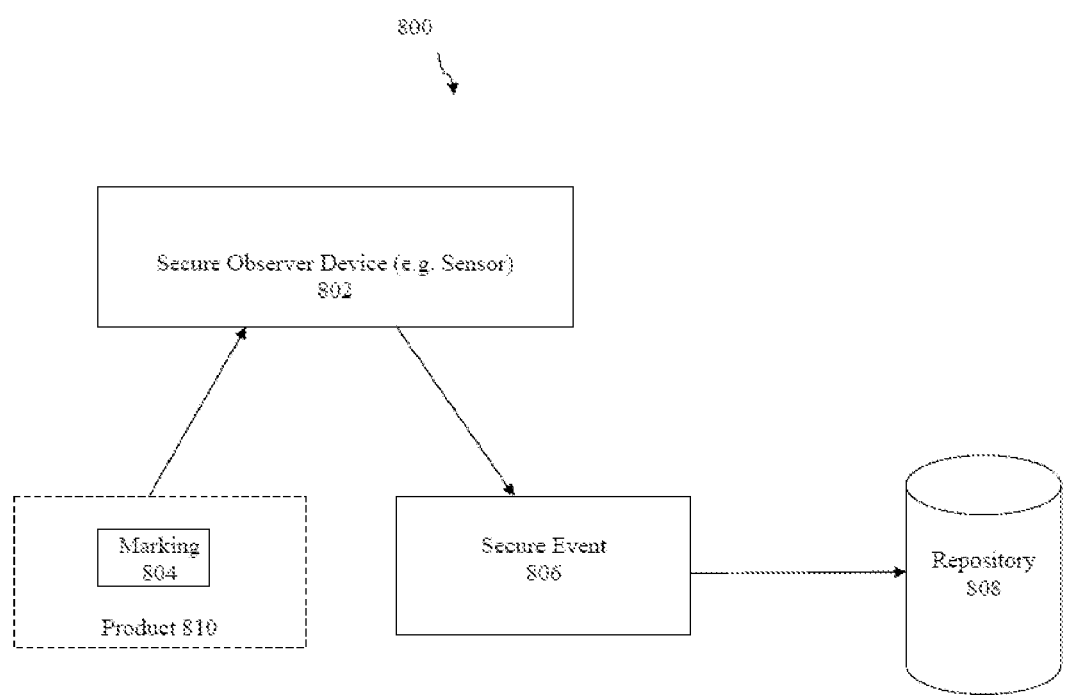
FIG. 7 illustrates an exemplary block diagram of generating a secure event in accordance with the system.

FIG. 7 illustrates an exemplary block diagram of generating a secure event in accordance with the system. The exemplary secure event system 800 includes various components, for example, a secure observer device 802 (e.g. a sensor), a product 810 with marking 804 (e.g. oil or fuel with a marking), a secure event 806 and a repository 808. The various components may be linked together via wired or wireless communication and may be the part of the same or different networks (not illustrated). As a product traverses a supply chain, the secure observer device captures data about the product. The captured data includes standard event information and secure event information. The captured data forms a secure event 806 which is transmitted to repository 808 for storage. Although the disclosed embodiment describes storage of the secure event 806 in repository 808, the disclosure is not limited to such an embodiment. Rather, the secure event 806 could be stored in the secure observer device 802, or in any other location accessible on the network.

The marking 804 on product 810 includes standard event information and secure event information. In one embodiment, the marking 804 includes both the standard and secure event information. That is, the marking may include various chemical compositions or include supplemental identifiers identifying standard and/or secure event information. In another embodiment, the standard event information is separate from the secure event information. A secure event 806 is any combination of data (marking) in which the secure event information is present. For example, a first product identifier identifies the standard event information (a first marking or no marking), and an authenticator or second product identifier (in the form of the marking) identifies the secure event information (a second marking). It is appreciated, however, that the disclosure is not limited to the described embodiment, which are exemplary in nature. The secure observer device 802 authenticates the marking 804 and may add a signature or encryption to the captured data and stores it as a secure event 806 in the repository 808.

Figure 8:
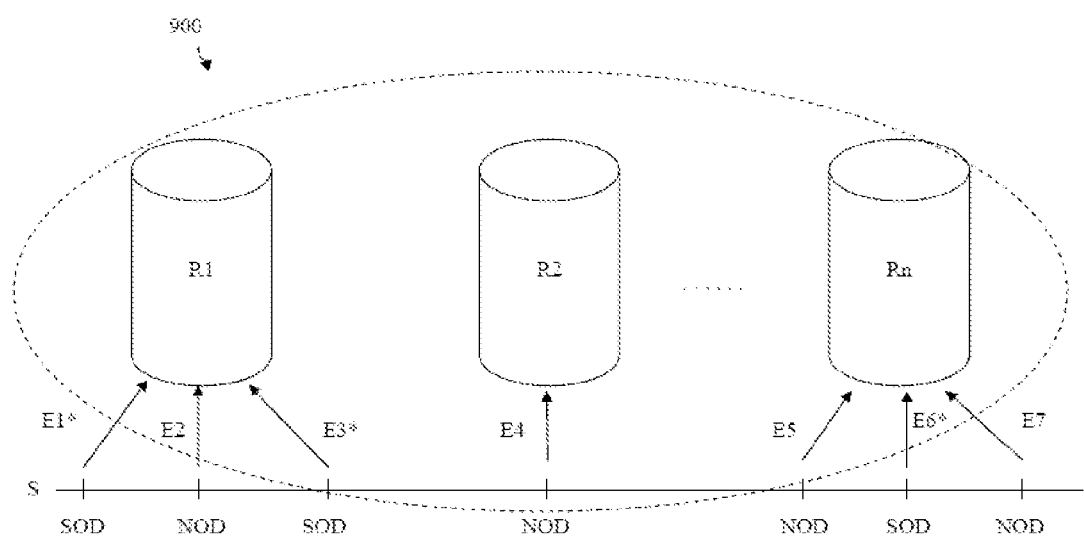
FIG. 8 illustrates an exemplary global repository in accordance with the system.

FIG. 8 illustrates an exemplary global repository in accordance with the system. The global repository 900 includes, for example, repository R1, repository R2 and repository Rn. The repositories R1, R2 and Rn may be located in the same or different networks and may be associated with the same or different custodians (e.g. custodians in the upstream, midstream and downstream sectors) along a supply chain S. In the illustrated example, several events occur as an item travels across supply chain S. An event in the exemplary embodiment is represented by the alpha-numeric En, where n is an integer representing the event number. In this case, a total of seven events (E1-E7) are illustrated. Events En with an asterisk ("*") represent a secure event and events without an asterisk represent a standard or non-secure event. As described above, a standard event is generated when a standard data capture device (normal observer device NOD) reads standard event information identified on a product in the supply chain S. A secure event, on the other hand, is generated when a secure data capture device (secure observer device SOD) reads standard event information and secure event information on a product in the supply chain S, which information is authenticated by the secure observer device SOD. As described, the NOD and SOD may be sensors or any device capable of identifying the marking in the product (or any other parameters captured by the secure observer device). In the illustrated embodiment, repository R1 receives secure events E1* and E3* captured from a secure observer device SOD, and a standard event E2 captured from a normal observer device NOD. Repository R2 receives a standard event E4 captured by a normal observer device NOD, and repository Rn receives secure event E6*, captured by a secure observer device SOD, and standard events E5 and E7, captured by a normal observer device NOD.

Significantly, the ability to authenticate a product using a secure data capture device improves the ability to detect counterfeit and/or adulterated or tampered products at a specific location in the supply chain S. That is, in the management system of the instant disclosure, authentication detection can occur at a specific location since secure events are based on a reading of a product identifier or authenticator (e.g. marking) and since different secure data capture devices can create different secure events based on the product identifier or authenticator. In traditional management systems, using for example EPCIS and conventional (normal) sensor technology, the counterfeit and/or adulterated and/or diverted and tampered products, assets or goods could not be detected at a specific location in the supply chain S, not even identified as occurring at some location between two points (i.e. two data capture device points) in the supply chain S. This is because the event captured in the traditional system, as explained above, is a standard or non-secure event in which an added level of authentication does not occur. Using the global supply management system of the instant disclosure, it is possible to retrieve the location of the adulteration and/or counterfeiting in a faster manner than in traditional management systems as a result of the added level of authentication of the global supply management system of the instant disclosure. Indeed, the search for the location of the adulteration and/or counterfeiting can be tremendously accelerated, since it can be limited to the portion of the supply chain located between the secure data capture device, where the authentication of the tracked product (or data captured from the SOD) failed, and the immediately preceding secure data capture device in the supply chain S (i.e. between two data capture SOD points).

Figure 9:
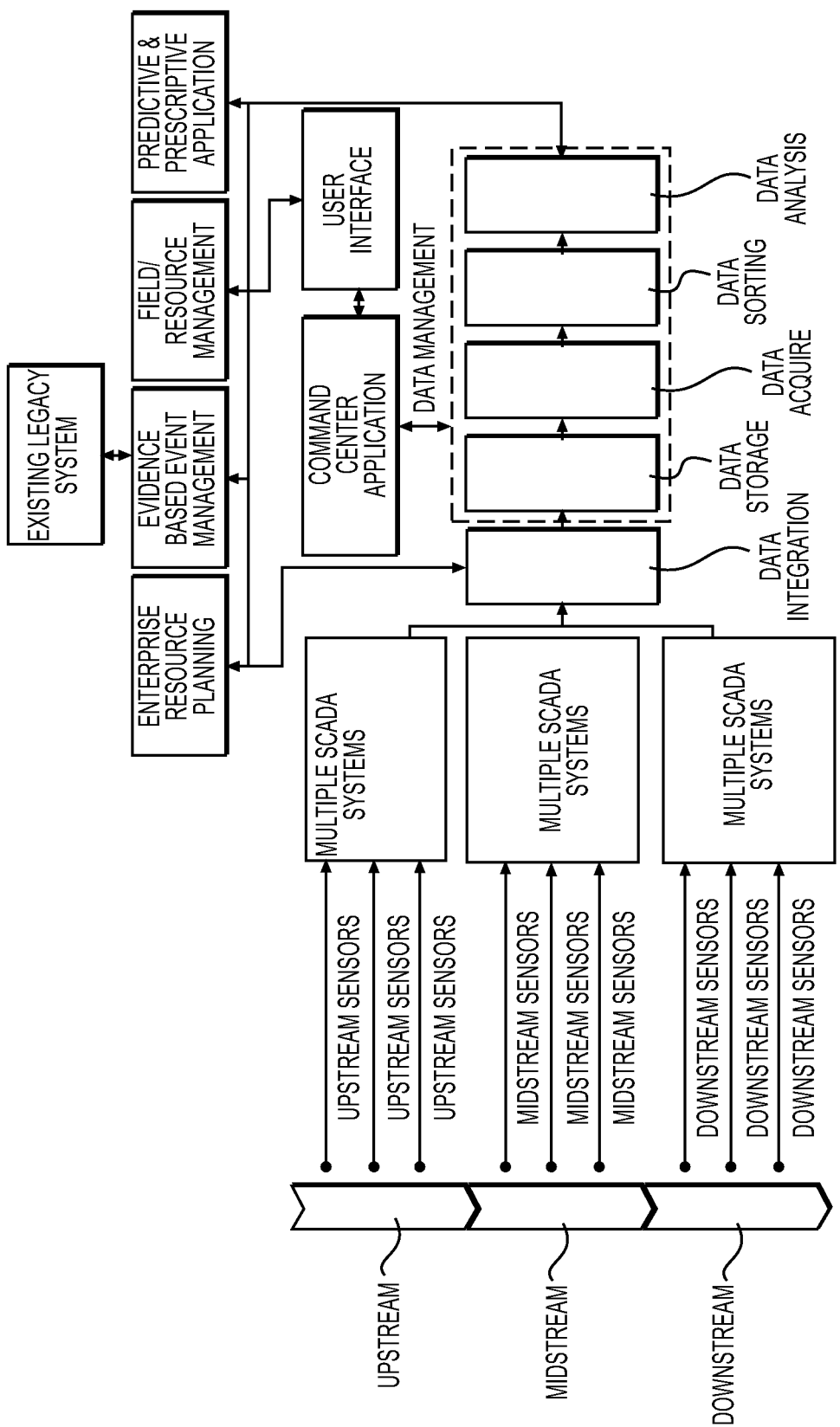
FIG. 9 is an exemplary diagram of a global management system in accordance with an embodiment of the disclosure.

FIG. 9 is an exemplary diagram of a global management system in accordance with an embodiment of the disclosure. The global management system GMS includes, but is not limited to, a control center CCC, a data management system, a data integration module, a user interface, a gateway interface, sensors, data collectors and the global supply management system (described herein) used for capturing data from upstream, midstream and downstream. The global management system GMS may also include or extend to external resources such as ERPs, field and resource management, predictive and prescriptive applications, evidence based event management and existing legacy systems. It is appreciated that the global management system GMS is not limited to the disclosed components, nor must it include each of the components illustrated in the non-limiting and exemplary embodiment. For example, the global supply management system, or a supervisory control and data acquisition (ICS such as SCADA) system may replace the collection of data instead of the gateway interface. As noted above, data may be stored in a single repository or multiple repositories.

The global management system manages oil and gas assets in a secure manner (or non-secure manner, if desirable) by monitoring for illegal activities on the supply chain, alerting authorities and/or authorized personnel and responding to the illegal activities in an appropriate manner. The global management system GMS collects the heterogeneous, unstructured and fragmented data from sensors, data collectors and monitoring sub-systems and also provided by the SOD, including the global supply management system, in the upstream, midstream and downstream oil and gas infrastructure (pipelines), to store and process the collected data using knowledge of the oil and gas infrastructure systems. The data is structured for additional processing and analysis, and the integrity of the structured data is verified and secured to prevent tampering. Eventually, as described above, the data is sent to the control center CCC for personnel to respond to theft or similar operational incidents. This process allows for a more rapid response than compared to current systems, as well as provide an evidential basis that constitutes material proof admissible in a court of law to support prosecution of criminal offenders. For example, drones may be used to provide on-site evidence that an event has occurred.

The integrity management system IMS collects the heterogeneous, unstructured and fragmented data from sensors, data collectors and monitoring sub-systems, including those from global supply management system and also provided by the SOD, in the upstream, midstream and downstream oil and gas infrastructure (pipelines), to store and process the collected data using knowledge of the oil and gas infrastructure systems. At the contrary of the GMS, the collected data is structured for additional processing and analysis, and the integrity of the structured data is verified and secured to prevent tampering, and clustered in a manner that all data related to tax issues or KPI issues, or management of subsidiaries or franchises by the corporate level, will be generated and use to create secure tax reporting, secure report for corporate level to manage efficiently the different entities in the oil and gas supply chain, allowing reconciliation of data related to tax and KPI and correct potential existing asymmetries in the oil and gas supply chain.

But both systems despite their different purposes are relying on common features such as gateway for example, or BRE modules, or clustered secure events to generate alerts or secure report or secure tax related data. But these systems GMS and IMS, will strongly rely on the data provided by SOD which are secure and accurate, to use them efficiently for their own purposes and functions. Alerts and intervention for GMS for example, Tax recollection or tax related data reconciliation or asymmetries correction for the IMS. The more secure data and reliable data we have on the system, the better the clustered events and corresponding secure report (KPI, tax estimation and value or tax reconciliation) we will have in the oil and gas supply chain.

More specifically, collected data will be acquired and processed in real-time and routed to the control center CCC (which may be in form of a physical command control center and/or an application operationally independent from personnel, or any combination thereof) for appropriate display to command center personnel. Structured data will be analyzed according to computational models and/or algorithms to identify events, where the events can be operational incidents such as those illegal activities described above and also operational problems, which may be identified and displayed to operators in real-time. In parallel (or at another time), the structured data and events may be entered into a prediction and prescriptive analysis module (predictive and prescriptive application) that uses machine learning, as described above, to identify sequences of measurements or computed data that are classified as "events" that require some form of action and/or reporting. The classification of an event, previously supplied by the data management system, can be confirmed (by a human operator or machine) and the results sent to the prediction and prescription module to improve the training set for the learning algorithm, allowing it to "learn" over the course of time. Using machine learning, the global management system or the integrity management system will learn which series of event measurements taken together will indicate that a certain event or cluster of events has occurred. Using the "learned" events, the system is able to utilize historical data and improve accuracy over time. The accuracy may also be supplemented by human or drone verification at the location an event occurs, and using the alerts generated by the system.

The data management system, similar to the control center CCC, may also be in communication with the prediction and prescription module, which will use machine learning on structured data and events as learning sets to classify events, which can be understood as sequences of measurements. The prediction and prescription module provides information to identify probable events (at varying degrees) in the future, or events in progress that may be sent as events to the control center CCC. The prediction and prescription module can also prescribe the event response most likely to result in a positive outcome based on the history of events. Similarly, recognized (or known) trends that occur over the course of time may be used to improve the clustered events to more accurately generate the alerts in the control center CCC.

Figure 10:
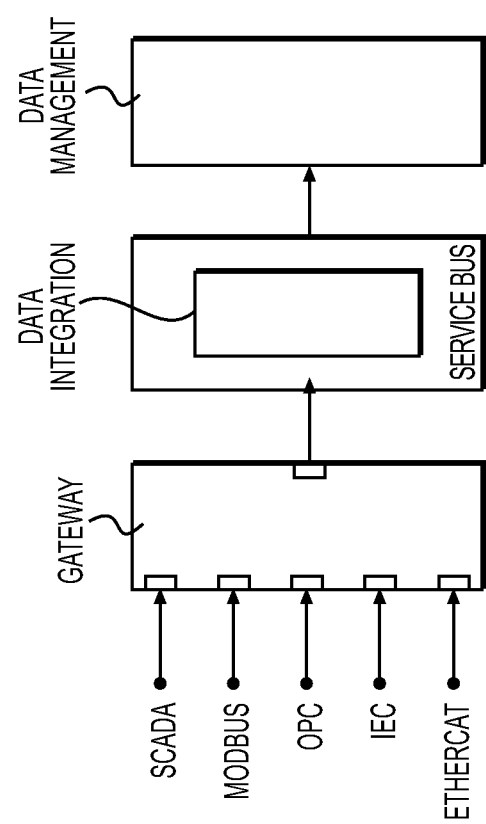
FIG. 10 illustrates an exemplary diagram of an interface in accordance with one embodiment of the disclosure.

FIG. 10 illustrates an exemplary diagram of an interface in accordance with one embodiment of the disclosure. As illustrated, the interface (gateway) receives data from one or more of a variety of sources. For example, the data collected from the upstream, midstream and downstream sensors that are processed by the SCADA systems is passed along to the gateway interface. In an alternative embodiment, the gateway replaces the industrial control system (such as SCADA) and collects data directly from the upstream, midstream and downstream sensors or other sources, such as from the global supply management system (which uses the aforementioned secure observer device). The gateway interface transforms (e.g. sorts, formats and modifies) the collected data into secure and formatted data that is compatible with the system, and in particular the data integration module, prior to being sent to the data management system for analysis by the global management system or in the integrity management system.

Figure 11A:
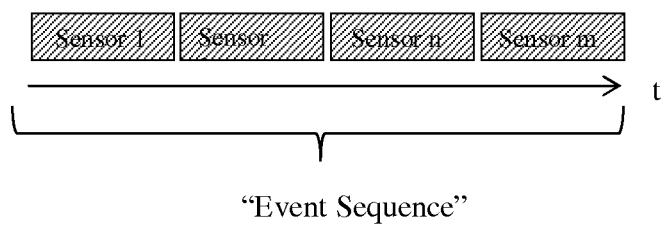
FIGS. 11A-11D show an exemplary sequence of events in which the captured data occurs over time to determine a probability.
Figure 11B:
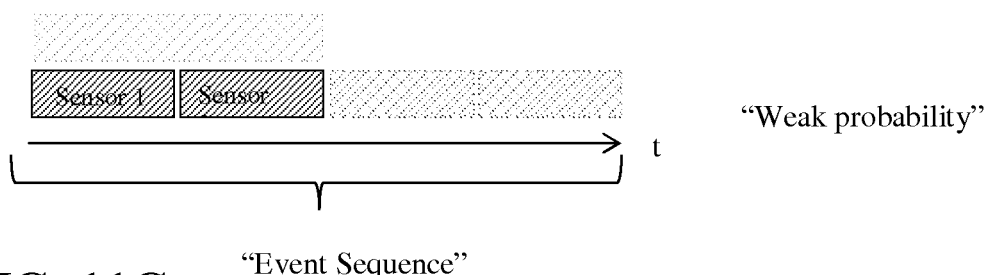
Figure 11C:
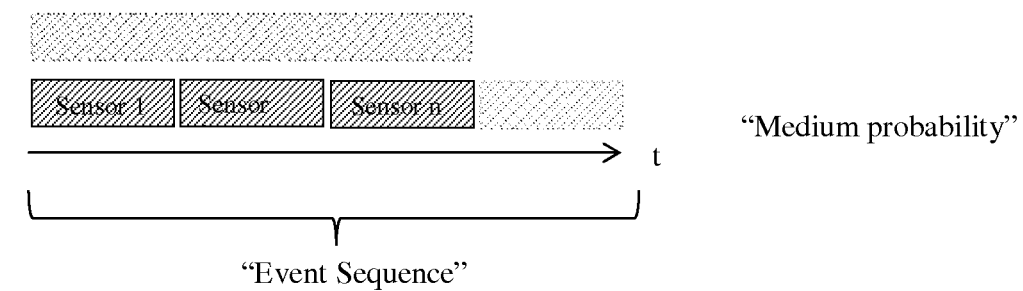
Figure 11D:
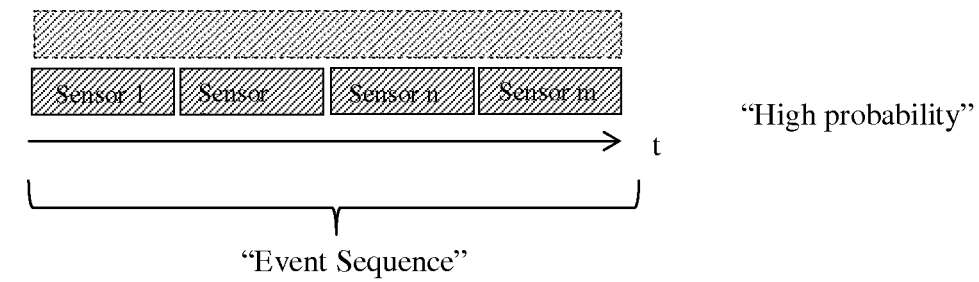

FIGS. 11A-11D illustrate exemplary sensor measurements and sensors collecting data along a supply chain in accordance with an embodiment of the disclosure. The collected data is processed by the integrity management system to clustered and structured data are generated or directly reported as a tax report, financial report, KPI report, secure tax form or any report useful to prepare a final tax declaration. Once a particular sequence of measurements (or sequence of events) associated with an event description is known (i.e. learned by the prediction and prescription application, events can be flagged in real-time with a probability score indicating the likelihood that a sequence of measurements unfolding will result in an identifiable event (such as a taxable event or sequence of taxable events). In the figures, the shaded boxes represent the values received from a given sensor. FIG. 11A shows an exemplary number of sensors 1 . . . m that are configured to capture a sequence of events. FIGS. 11B, 11C and 11D show an exemplary sequence of events in which the captured data over the course of time t represents a weak probability, a medium probability and a high probability, respectively, of the event having occurred (termed here, the event probability). The event probability is sent to the data management system DMS, excise platform interface and excise tax remediation platform identifying a taxable event, such as "500 barrels of fuel sold at location X on a given date.

To improve efficiency, using the predictive and prescriptive module, based on past events contained in historical data of measurements and events, patterns may be generated and used from the historical data to assist in predicting future events (i.e. taxable events) before the sensors and data collectors begin to register data. Using this predictive data, the excise tax remediation platform (which is interfaced with the DMS in the IMS system as described in FIG. 5) and personnel operating the excise tax remediation platform could be alerted to predicted areas for taxable events identified by the system using data in the system, such as time of day, day of week, month or specific dates, previous event sequences, and the like. It is appreciated from the above that that the integrity management system IMS is capable of recording the evolution of tax related events, and link them together for providing a history to analyze and improve the data analysis in the data management system DMS. Based on the prior knowledge of events having occurred in the past, historical data and verification that the events actually occurred, such as pump volume delivery, quantity of fuel transported and number of barrels of fuel, payment, cash management and generation of an invoice, future events can be more accurately predicted and the events themselves may be better interpreted during monitoring and analysis. Additionally, the integrity management system IMS by virtue of its predictive and prescriptive nature is able to mitigate corruption by people, for example operating personnel at a subsidiary, third party, franchise, etc. are less likely to provide falsified tax documents given the monitoring and control by the excise tax remediation platform. Accordingly, it becomes increasingly difficult, for people involved with the illegal activities to avoid detection by deleting data, changing data, paying off personnel monitoring the data, etc.

Significantly, to avoid these types of situations from occurring, the integrity management system provides: secure and unforgeable data which may not be deleted, alerts based on the correlation of clustered events that give a high probability of falsified activity (e.g. falsification of tax related information), which activity may be displayed to an operator and recorded as alerts that are also unforgeable and may not be deleted. Alternatively or additionally, the system itself may intervene in place of personnel to identify and send urgent information to external authorities such as a tax administration, corporate governing entity, etc. Accordingly, a part of the system is to supply an alternative to human error and inadequacies in detecting such falsified information.

Further non-limiting examples of the integrity management system IMS, are provided below with respect to the midstream and downstream sectors. In the midstream sector, tax related activities typically occur by modifying collected data and/or falsifying records and materials, such as tax reports and tax declarations. For example, upon receipt of a taxable transaction, such as receipt of payment for the purchase of 500 barrels of oil, the receipt may be forged such that the excised tax is minimized. In doing so, when a tax report is being prepared, the information related to the taxable transaction will reflect the forged receipt. As countermeasures and in accordance with the objectives of the integrity management system IMS, the barrels may be lined with several sensors and/or data collectors that will monitor and collect data therefrom. For example, each barrel may have a sensor that detects when a barrel is moved from a distribution center to a retail outlet, signifying that a purchase of the barrel(s) has occurred. The integration management system IMS may be used to monitor and collect data related to the transaction as it occurs. The collected data from the sensors and data collectors will be sent to the corresponding gateway (FIG. 8) or industrial control system ICS, and escalated to the data management system DMS and on to the control center CCC, as described herein above. Additionally, the collected data should be updated in a manner that it may be interpreted to provide conclusions and recommendations. For example, if the sensor(s) or data collector(s) only detect the purchase of a barrel(s) once a week, the sensor(s) and data collector(s) may not capture the purchase activity during the remaining six days in the week. If, on the other hand, the purchasing of a barrel(s) is measured twice daily, the sensor(s) and data collector(s) will be able to more accurately detect and calculate the purchase of a barrel(s) (or any other type of data) indicating that a taxable transaction or activity is occurring. Linked with the localization of the sensor(s) and data collector(s), a drone or personnel could alternatively or simultaneously monitor the regional location, images could be captured from a local camera, and the system could be notified that the activities are underway.

Another non-limiting example of data in the midstream is a tanker truck transporting crude oil and petroleum. In this example, the collected data is GPS information generated by the trip made by the truck, and the volume of the content of the truck's tank. If the data collected over time indicates, for example, that the truck is stopping at a location longer than anticipated, or there is a variation of volume of the content of the tank, this may indicate that illegal activities are occurring or have occurred. For example, the variation of volume of the content in the tank may be an indication that someone is attempting to avoid reporting of the event as a taxable transaction. In another example, the truck can be stopped at an overnight rest area. Since these areas are a known, regular stop for an extended period, volume sensors on the truck may be activated to monitor variations in the content of the tank. Any change in variation detected by the sensors can be escalated through the data management system DMS to the control center CCC after the data has been analyzed. The system's learning engines will become aware of the region and expectation of activities in the area, and apply such knowledge in further analysis. Again, such activities could be indicative of someone attempting to avoid a specific event that has taxable consequences.

In the downstream sector, a non-limiting example is provided in which collected data includes the volume produced in a refining factory. The volume data may be linked, for example, with the number of trucks required to transport the truck's content (fuel) to retails shops. As understood, once the fuel reaches the retail shops, it is unloaded into shop tanks for storage. Here, the volume is transferred and the fuel is distributed. Sensors and data collectors may then be used to measure the corresponding volumes exchanged, and cash generated by the sale of fuel. If the volumes and sales do not match, this could indicate illegal activities, such as falsified documents being generated to avoid or elude a taxable event. This information may also be useful for tax recollection or reconciliation, to estimate the amount of fuel required in a particular region, etc. As appreciated, the data is not only collected, but also stored in a repository and transformed into a sum of clustered events that may be linked, used or analyzed for prescriptive or predictive action.

Figure 12:
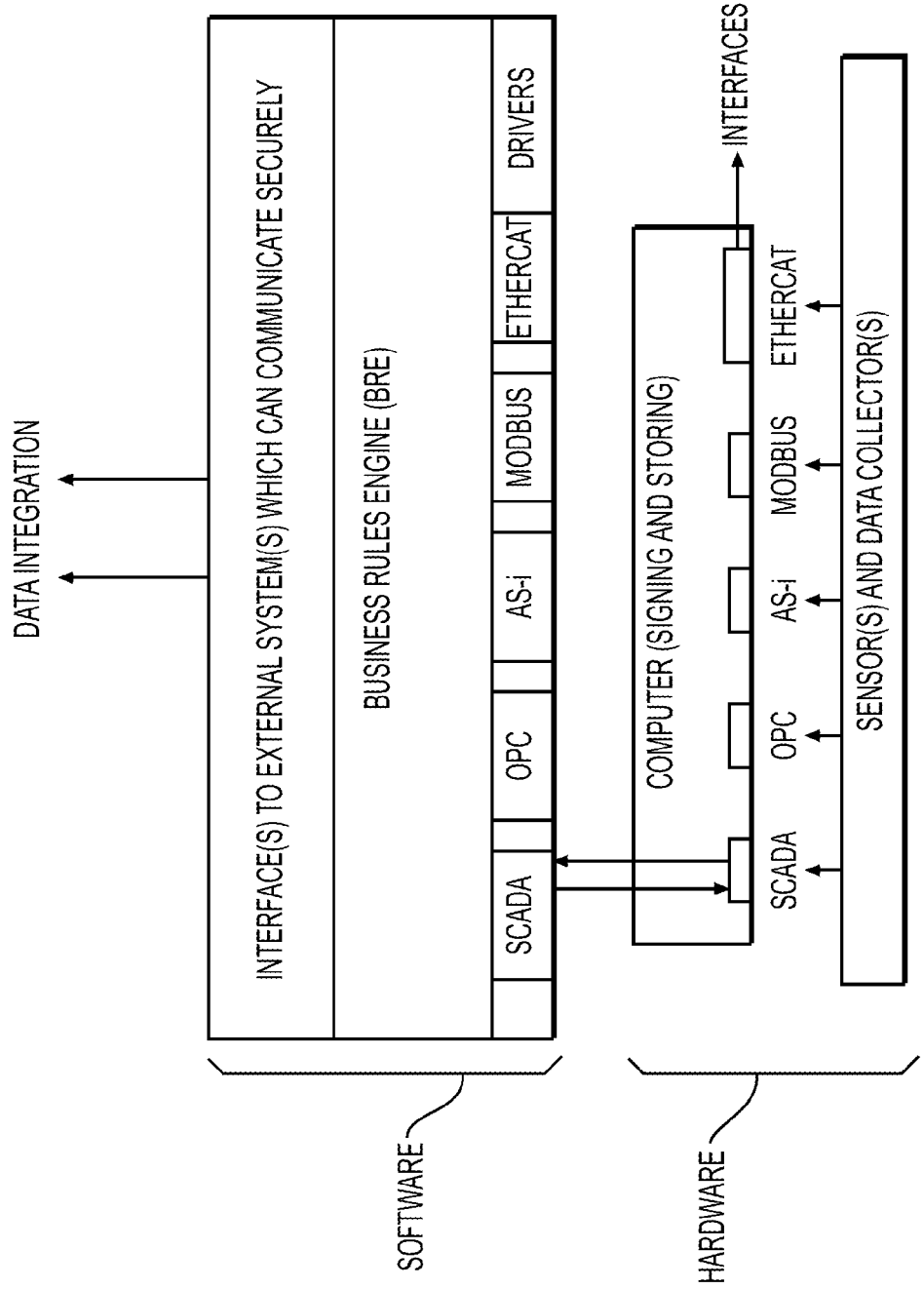
FIG. 12 is an exemplary diagram of an interface in accordance with one embodiment of the disclosure.

FIG. 12 is an exemplary diagram of an interface in accordance with one embodiment of the disclosure. The interface, in this application also referred to as the Gateway or Gateway interface, interfaces the data sensors that are positioned along the upstream, midstream and downstream sectors to external sources, such as an enterprise service bus ESB or the data global management system via the data integration module. As illustrated, the gateway is divided into three layers including: (1) the computer (e.g., for signing and storing) which communicates with industrial control systems (such as SCADA, OPC, AS-i MODBUS and Ethercat). The drivers may be a combination of physical interfaces and software, (2) the business rules engine (BRE) which correlates, secures, authenticates, filters, reconciles, provides unforgeability, and creates key value data. The BRE will also from the data collected, make association of data collected into objects, create events based on non-integrity of objects, create events-based alert or events-based on thresholds or on business rules or on trends, and (3) the interfaces that interface with the external systems using, for example, HTTPS, SSL or any other known software or hardware protocol.

The gateway interface provides, among other features, a mechanism to transform the collected the data into a format that is further secured and which is compatible with the external system to which the transformed data or objects or events or alerts created in the Gateway will be sent. For example, the gateway interface will secure the collected data from the sensors and/or data collectors as well as formatting the collected data to be compatible with the data integration system before being used in the global management system or in the integrity management system especially at the Data Management System (DMS) level. The gateway interface interfaces with external systems using, for example, protocols such as HTTPS, SSL, etc. External interfaces include, but are not limited to, an enterprise service bus ESB or an industrial control system ICS, such as the gateway management system GMS described herein, transaction systems or financial transaction systems.

At the driver layer, the drivers which communicate with external systems, such as the ICS system, may be hardware, software or any combination therefore. The hardware and software is preferably tamper resistant and secure in order to avoid attacks on the physical hardware as well as malicious attacks on the software, for example by hackers, injection of unwanted data or the like. The data that will be generated and created in the gateway interface will be more secure and provide enhanced properties in addition to those collected from the various repositories of data, such as the SCADA or ICS. The secure and enhanced data will then be provided to the global management system or in the integrity management system and assist in creating the clustered events. The gateway will also verify that data being received from the sensor(s) and data collector(s) are authentic data and have not been corrupted by external sources or otherwise. That is, the gateway will first have the capability to authenticate data being received before securing the data and adding additional properties. This will ensure that the data to be secured and enhanced is authenticated prior to being passed to the global management system or in the integrity management system, and will avoid corrupted data being sent to the global management system or in the integrity management system. One weakness of existing systems in the oil and gas supply chain is the incredibly large volume of data. If the system becomes contaminated or infected with fake, counterfeit, fabricated or inaccurate data, the data captured will not be reliable and any events or clustered events created in the global management system or in the integrity management system may potentially compromise the alerts generated from the clustered events. Accordingly, any data to be accessed or used in the global management system or in the integrity management system (via the data integration module), using the gateway, should be as secure and accurate as possible. An example of authenticating the data that will be inserted in the gateway, is to capture from the sensors especially the SOD, or from several times the information it is supposed to capture and in a short period of time and verifying that the data collected is always of the same nature (e.g. the temperature is captured ten times during 30 seconds and the value is quite the same, then the data seems to be correct). Another example of authenticating or being sure that the data is accurate is to add to the sensor an electronic system or mechanism that protect it from tampering or diversion and protect the access to the sensor by any means, the data collected from the sensor and then send to the gateway will be accurate as possible. Another example to be sure that the data is accurate is to: i) Use a tamper-proof sensor; ii) Compare the data with that from other sensors to make sure they are coherent (for example, if the temperature increases in one sensor does it also increase in nearby sensors? Does the pressure change as a consequence? Etc. iii) Anomaly detection: use machine learning on past data to detect anomalous sensor readings.

The gateway interface collects data either via the physical interfaces to industrial sensors utilizing industrial communication protocols, such as OPC or Ethercat, or via virtual (i.e. software) interfaces to existing monitoring or control systems, such as SCADA. The interfaces are powered, for example, using software drivers which can be dynamically loaded or unloaded depending on the physical or virtual requirements. For example, if there are three OPC powered devices and an Ether cat device physically attached, then there would be three OPC drivers and a single Ethercat driver.

Once the data reaches the gateway interface, the Business Rules Engine BRE create new monitoring data by correlating captured data, filtering irrelevant data, for example non-security related events, validating read/write access to/from the driver layer to the integration layer (in both directions), and applying security/access/authentication rules, using an external system if necessary. It is appreciated, however, that these functions are only exemplary and the BRE is not limited to such functions.

At the interface layer, the software in the gateway interface may also interact with external systems based on the monitoring requirements. For example, the interface may include an email interface, a web interface, etc. The interface layer may also interface with the enterprise service bus ESB as a messaging system (for example, utilizing a protocol such as REST over HTTPS) to integrate data from all gateway interfaces and external systems into the data storage component of the global management system or in the integrity management system. It is also appreciated that although the diagram illustrates an interface to the gateway interface, the gateway interface may also be directly connected or a part of global management system or part of the integrity management system.

The enterprise service bus ESB software is a messaging system similar to the IBM™ products MQueue Series and BMC Control. The ESB software, which in the instant embodiment is referred to as the data integration module part of the global management system or the integrity management system (although it is appreciated that the ESB could also be a separate entity), could be application such as Open ESB developed by Sun Microsystems™ or WSO2 ESB. A JAVA based programming language may be used as the programming language to achieve such software.

The Business Rules Engine BRE (the second layer) acts as the transformation processing of the captured data and applies rules which can be configured to represent a particular element of interest, such as a potential security incident. The BRE monitors all activities and measuring points of all the drivers loaded, along with any physically or virtually connected devices. By accessing all of these measuring points in real time, the BRE can create new measuring points or data useful to create clustered events in the global management system or in the integrity management system. The BRE will also from the data collected, make association of data collected into objects, create events based on non-integrity of objects, create events-based alert or events-based on thresholds or on business rules or on trends. For example, measuring point A on a physically connected device (such as a temperature sensor) and measuring point B (such as a variable from an external software SCADA system) under specific thresholds can create new data based on both measuring point A and measuring point B. For example, new data C may be created, where the new C data is an appendage of measuring points A and B and which can constitutes an event. This enables the BRE to correlate data for a better understanding of events as they occur. The events generated in the Gateway are based on the data collected from sensors, data collector or ICS systems. To these data which have been checked in their accuracy before entering in the Gateway, addition of attributes to the data to obtain enhanced data is made.

In one embodiment, if the sensors, data collectors or ICS systems are not reliable or able to check the accuracy of the data, the checking is made in the Gateway. The events created in the Gateway will be useful in the data management system DMS of the global management system or in the integrity management system to create the clustered events or a reliable secure tax report or secure KPI or helping for tax recollection purpose or tax remediation or correcting asymmetries (based upon which system, GMS or IMS, they will pass through). The clustered events or reliable secure tax report or secure KPI or helping for tax recollection purpose or tax remediation or correcting asymmetries are used in the global management system or in the integrity management system to create and/or display alerts at the CCC level and will allow in the context of the present invention to mobilize efficiently the corresponding field intervention (e.g., police when theft of material, fireman if explosion, etc.). On the other hand The BRE will also have the ability to analyze the relevancy of the collected data from sensors, data collectors or ICS systems, if they are well structured as events, collected from the SOD sensors in the supply chain and if these data are secure enough, the BRE will send them directly to the data integration module, to be then in the GMS or IMS treated to generate clustered events or reliable secure tax report or secure KPI or helping for tax recollection purpose or tax remediation or correcting asymmetries.

The BRE may also act autonomously if enough physical and/or virtual information is available to determine, based on data collected events useful for creating in the global management system or in the integrity management system clustered events without reliance on any external system, the clustered events will be useful to determine actions such as notifications to identify or alert security incidents and other actions. Definition(s) of the clustered events is managed via the data management module of the global management system or in the integrity management system as part of the "learning" nature of the system. The BRE stores and queues, when necessary, these data and encrypts or signs each data to ensure the data is complete, authentic, accountable, non-repudiated, and protected from external access, modification, disruption and destruction. It is appreciated that any one or more, none or all of these features may be used, in addition to another form of functionality. The encrypted data may then be accessed by external systems based on, for example, security profiles of the system requesting the information.

Figure 13:
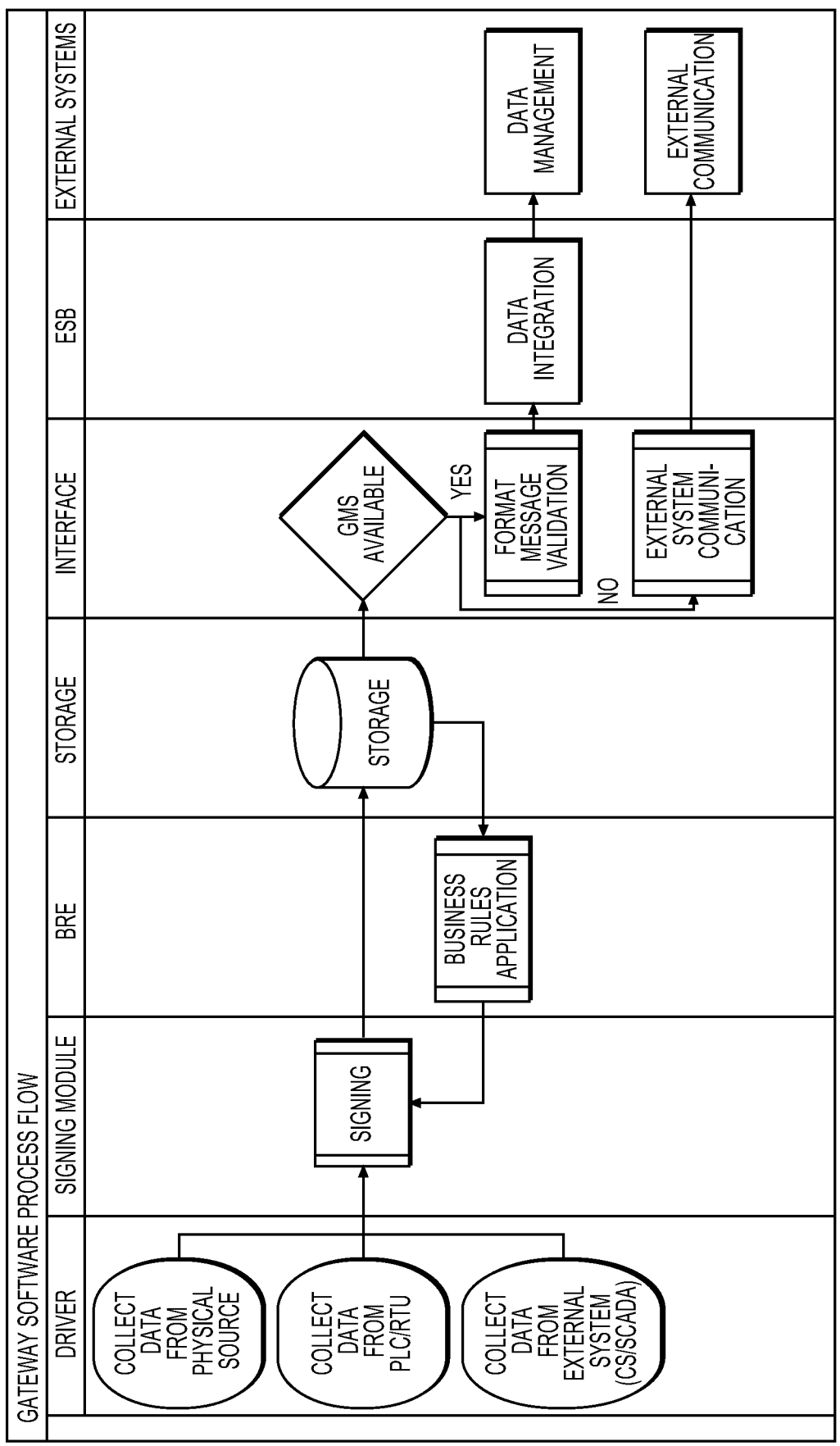
FIG. 13 is an exemplary embodiment of a process flow of the interface in accordance with one embodiment of the disclosure.

FIG. 13 is an exemplary embodiment of a process flow of the interface in accordance with one embodiment of the disclosure. The drivers of the gateway interface collect data from a variety of sources including, but not limited to, physical sources, programmable logic control (PLC) and remote terminal units (RTU) and any other type of source. The business rules engine BRE processes the data, correlates the data and creates from the data events or a sequence of events, as described in detail above. The data and events are optionally signed by a hardware or software security module (HSM or SSM). Events and enhanced data may be stored in a secure repository or data storage. The gateway then checks to determine where the data will be sent (GMS available), for example to the global management system or in the integrity management system or another external system. If the global management system or in the integrity management system is available, then the data or events are formatted and validated for use by the global management system or in the integrity management system. Data going to an external system may or may be formatted and validated depending on the external system requirements. Data or events being passed through the gateway is sent to the data integration module, which stores the data or the events, acquires the data from storage, creates for example a key value data structure from the data, sorts the structure data and analyzes the structured data using computational models and algorithms to identify correlation between data useful for the creation of clustered events or reliable secure tax report or secure KPI or helping for tax recollection purpose or tax remediation or correcting asymmetries in the global management system or in the integrity management system. The data is also checked for integrity of the structured data and the security of the structured data to prevent tampering. The data interface may be an independent interface or part of the data management system. If separate, the data is then passed along to the data management system for processing in accordance with the embodiments described above.

The examples and disclosure that follows relate to the global supply management system or the integrity management system (tracking system) as a source of collecting data as an alternative to using sensors or data collectors. That is, the secure observer device (SOD) discussed above with respect to the global supply management system (track and trace) could be replaced by the sensors and data collectors described with respect to the global management system or in the integrity management system. For example, in the midstream of the supply chain, secure data D may be generated in a pipeline using the sensors to collect the data, and secure data D may be generated in by observing and detecting marked fuel in a truck. For example, the marking will be in the fuel (or other asset) such that a regular check and verification along a truck route will generate secure data D (which may be passed along to the global management system or in the integrity management system). If, for example, dilution of the product (e.g. fuel) concentration varies along the pipeline, the sensors (which act as a secure observer device (SOD)) will generate secure data D by adding a secure algorithm or other attribute. The secure data D may also be generated based on an analysis of the fuel marking of the crude oil against the collected data on the pipeline, and may be inserted in an ERP and passed on to the gateway interface. The data created will be used to create secure clustered events inside the data management system and useful to create alerts on the control center CCC for both GMS or IMS system.

In another embodiment, instead of marking the product (e.g. fuel), the sensors on the pipeline will act as secure observer device (SOD) along with a classical sensor which measures the specified values and sends them to the repository. The sensor will send the data with encrypted and secure attribute(s), and will double check the data before sending it as secure data in order to be sure that the data is authentic.

Another non-limiting example of secure data D created occurs in the downstream sector. During the refining process, which is useful to create fuel or petrol, different batches of fuel can be marked differently. Only a corresponding fuel with a secure marking will be sent to a particular region of the country. In one embodiment, different chemical markings at different locations through different channels of distribution leads to different retailers. The chemical marking is based, for example, on specific mixtures of organic or inorganic luminescent compounds (IR, Near IR, UV), each specific mixture representing a specific chemical key. In another embodiment, different fuel grades or types have different markings. By capturing the data, it can be determined if the reported transaction for a certain grade of fuel was actually for the right physical product to detect if someone declared, for example, transactions for a low-tax product when he really made a transaction for a high-tax product.

Capturing the data using a secure observer device SOD will provide the ability to determine whether any illegal activity, such as theft or diversion of the product, has occurred during transport. For example, in a region of a country (for example, Sinaloa), a fuel produced will be marked by compounds A, B and C. The marked fuel will then be distributed to a gas station in Sinaloa. In the region of Zacatecas, on the other hand, fuel marked with D, E and F compounds will travel along the road until reaching a gas station in Zacatecas. If for some reason fuel marked with compounds D, E and F is retrieved or found in the gas station in Sinaloa, the global management system GMS (having received data collected regarding the marked fuel) will determine that product has been tampered with at some point. For example, it will be determined that the fuel originally targeted for delivery in Zacatecas has been diverted (illegally) to the region of Sinaloa. Similarly, a pipeline may be segregated according to a region, and the secure data D generated in the pipeline regions will be captured by the secure observer device SOD. The global management system GMS will in turn be alerted based on clustered events generated with specific secure data D (linked with sensors in a specific region of a pipeline). The global management system GMS will be able to precisely locate where problems occur in a specified region based on this information.

Using the global supply chain management system to trace, track and store secure events along a supply chain, the stored information may be used in conjunction with the global management system GMS, and in particular, the gateway component. In this context, for example, the global supply chain management system acts as an industrial system ICS to provide such information to the gateway or data integration module, as illustrated in FIG. 8. As described above, data collected from any part of the oil and gas supply chain to be used to create clustered events (secure), notifications and alerts in the global management system at the control center CCC and to act prescriptively or predictively at the field of intervention level. These alerts, for example, are based on and obtained as a result of the clustered events which have been developed using data mining, historical recollection and verification processes and manipulation of data based on previously collected data.

Capturing the data using a secure observer device SOD will provide the ability to determine whether any illegal activity also has an impact on the tax recollection, and will be detected by the IMS. For example, the capture by an SOD, of the volume of fuel delivered in a tank or a truck for gas a station will allow the system to have a correct estimation of the volume transported from plant to gas station and the corresponding tax that should be recover by the state. The volume correlated with the marking of the fuel, as previously described, and captured also by an SOD, will allow for when specific gas stations receive a specific fuel marked, and to estimate how much tax the corresponding gas station will have to pay to the state.

The examples that follow highlight the capture of data and information from the global supply chain that are passed to the global management system or in the integrity management system. It is appreciated that the examples are non-limiting.

Fuel marking: Different markings (e.g. different chemical compositions) from different regions and/or different concentrations of the marking(s) are used to mark the product, such as fuel. For example, fuel with the marking(s) is transported via a pipeline or in tanks of a truck. If a variation of the concentration of the marking in the fuel, or a presence of another liquid (such as water), is found to be within the fuel, the system (e.g. sensors or secure observer device SOD) will detect the variation and notice the difference as the product travels from one region to another region. The SOD or sensor may be used to capture the marked fuel and will create a corresponding, secure event(s) or data for delivery to the gateway management system (to the gateway or data integration module). These data will then be used to detect counterfeit, diversion, stealing of material, fraud, tax fraud, etc., as described above.

Pipeline Monitoring: At the pipeline level, the product (e.g. fuel) may be monitored using sensors or handheld sensors (SOD). These sensors are secure sensors that may be in addition to or replacing conventional sensors. A convention sensor is not capable of detecting any of the markings in the product, whereas the secure sensors can detect such markings. Accordingly, any data collected by the secure sensors may be added to the conventional sensor data and verified or checked by a hardware security module HSM or a SSM module and send the verified/checked data securely to the gateway and/or the data integration module. Each sensor may be unique and send secure events and data securely. On the other hand the collected data from the SOD is redundantly checked or acquired several times and averaged and verified to confirm the accuracy of information in the collected data prior to being transferred to the gateway and/or the data integration module. Additionally, the data may include a unique tag reflecting its position along the pipeline, and stored as such in a corresponding repository or in the clustered events generated at the data management system level in the global management system or in the integrity management system. The retrieval of information along the pipeline, along with its location, can then be accomplished when a problem and/or maintenance occurs at the pipeline level.

Gas Station Pump Monitoring: Generation of secure events may also occur to monitor consumption and provision of petroleum at the gas station level. For example, each pump in a gas station may be equipped with a secure observer device SOD (e.g. sensor) able to determine the marking inside the fuel and transmit the information securely. This will afford the certainty that for a specific marking, the gas station is authorized to distribute the fuel (petrol), thereby assuring proper and un-adulterated delivery of the product to the gas station. The SOD may also be used to create secure events and data linked with the volume of consumed petrol or delivered petrol in conjunction with the amount of petrol sold at the gas station. This data, created by the SOD, may be used for several purposes, for example, including tax recollection and to determine whether the amount of income at the gas station and the volume of petrol delivered to vehicles at the gas station are consistent. As in the pipeline example, the SOD information may be secured by HSM or SSM and uniquely communicate securely with the gateway and data integration module.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for creating secure data related to oil and gas assets while traversing a supply chain, comprising:
   sensors provided along the supply chain, wherein each sensor from the sensors is configured to capture data including volume of a product, standard information of the product from a product identifier and secure information from a marking, authenticate the marking and add encryption to the captured data creating thereby encrypted data, wherein the product is marked with the product identifier and the marking, wherein the captured data includes a unique tag reflecting a location of the product along the supply chain at a moment when the data is being captured;
   at least one repository system which is configured to collect the encrypted data from the sensors and send them to a gateway,
   wherein the gateway provides a mechanism to transform the encrypted data received from the at least one repository system into a format that is further secured and which is compatible with a data integration system before used in a global management system or in an integrity management system, and further wherein data generated and created in the gateway are provided to the global management system or the integrity management system to create clustered events, and further the gateway is configured to verify, before transforming the encrypted data received from the at least one repository system, that the encrypted data received from the at least one repository system are authentic data and have not been corrupted by external sources,
   wherein the product is oil or fuel transported via a pipeline or in tanks of a truck, and the marking is inside the product and comprises a chemical composition identifying the secure information,
   wherein the captured encrypted data relate to a specified event occurring in the supply chain,
   wherein the collected data from each sensor of the sensors is acquired several times for a predetermined period of time being not more than 30 seconds to obtain, for each sensor, a set of the collected data related to the product, and for each set of the collected data, the collected data from the set is verified as to whether the collected data from the set has essentially the same value, prior to being transferred to the gateway, wherein the data measured by each of the sensors is considered to be correct if the data measured by each of the sensors does not essentially change for the predetermined period of time, and if the collected data from the set is verified to have essentially the same value, the collected data from the set is verified to be correct.

2. The system for creating secure data according to claim 1, further comprising an event management platform to obtain supply chain visibility using the collected secure data to identify at least one of tampering, diversion, adulteration, counterfeiting, fraud and tax fraud of the product in the supply chain.

3. The system for creating secure data according to claim 2, wherein the repository system communicates with the event management platform via a network and includes a plurality of storage devices accessible by and distributed among the system.

4. The system for creating secure data according to claim 1, wherein the chemical composition has compounds with luminescent properties in the range of at least one of UV, IR and Near IR and mixtures thereof which may represent a chemical key.

5. The system for creating secure data according to claim 1, wherein the product identifier is linked to the marking.

6. The system for creating secure data according to claim 1, wherein the system further comprises an electronic system or mechanism added to at least one sensor of the sensors, which is configured to protect the at least one sensor from tampering or diversion and to protect the access to the at least one sensor by any means.

7. The system for creating secure data according to claim 1, wherein a concentration of the marking in the product further identifies the secure information.

8. The system for creating secure data according to claim 1, wherein the system is configured to monitor variations of the captured volume of the product at different locations of the captured locations.

9. The system for creating secure data according to claim 1, wherein at least one sensor of the sensors is a secure sensor.

10. A method for creating secure data related to oil and gas assets while traversing a supply chain, comprising:
   by each sensor from sensors provided along the supply chain, capturing data including volume of a product, standard information of the product from a product identifier and secure information from a marking, authenticating the marking, and adding encryption to the captured data creating thereby encrypted data, wherein the product is marked with the product identifier and the marking, wherein the captured data includes a unique tag reflecting a location of the product along the supply chain at a moment when the data is being captured;

collecting and sending the encrypted data from the sensors by at least one repository system to a gateway, wherein the gateway provides a mechanism to transform the encrypted data received from the at least one repository system into a format that is further secured and which is compatible with a data integration system before used in a global management system or in an integrity management system, and further wherein data generated and created in the gateway are provided to the global management system or the integrity management system to create clustered events, and further the gateway verifies, before transforming the encrypted data received from the at least one repository system, that the encrypted data received from the at least one repository system are authentic data and have not been corrupted by external sou rces, wherein the product is oil or fuel transported via a pipeline or in tanks of a truck, and the marking is inside the product and comprises a chemical composition identifying the secure information, wherein the captured encrypted data relate to a specified event occurring in the supply chain, wherein the collected data from each sensor of the sensors is acquired several times for a predetermined period of time being not more than 30 seconds to obtain, for each sensor, a set of the collected data related to the product, and for each set of the collected data, the collected data from the set is verified as to whether the collected data from the set has essentially the same value, prior to being transferred to the gateway, wherein the data measured by each of the sensors is considered to be correct if the data measured by each of the sensors does not essentially change for the predetermined period of time, and if the collected data from the set is verified to have essentially the same value, the collected data from the set is verified to be correct.

11. The method for creating secure data according to claim 10, further comprising obtaining supply chain visibility, in an event management platform, using the collected secure data to identify at least one of tampering, diversion, adulteration, counterfeiting, fraud and tax fraud of a product in the supply chain.

12. The method for creating secure data according to claim 11, wherein the repository system communicates with the event management platform via a network and includes a plurality of storage devices accessible by and distributed among the system.

13. The method for creating secure data according to claim 10, wherein the composition has compounds with luminescent properties in the range of at least one of UV, IR and Near IR and mixtures thereof which may represent a chemical key.

14. The method for creating secure data according to claim 10, wherein the product identifier is linked to the marking.

15. A non-transitory computer readable medium storing a program to create secure data related to oil and gas assets while traversing a supply chain, the program when executed by a processor, comprising:

by each sensor from sensors provided along the supply chain, capturing data including volume of a product, standard information of the product from a product identifier and secure information from a marking, authenticating the marking, and adding encryption to the captured data creating thereby encrypted data, wherein the product is marked with the product identifier and the marking, wherein the captured data includes a unique tag reflecting a location of the product along the supply chain at a moment when the data is being captured;

collecting and sending the encrypted data from the sensors by at least one repository system to a gateway, wherein the gateway provides a mechanism to transform the encrypted data received from the at least one repository system into a format that is further secured and which is compatible with a data integration system before used in a global management system or in an integrity management system, and further wherein data generated and created in the gateway are provided to the global management system or the integrity management system to create clustered events, and further the gateway verifies, before transforming the encrypted data received from the at least one repository system, that the encrypted data received from the at least one repository system are authentic data and have not been corrupted by external sources, wherein the product is oil or fuel transported via a pipeline or in tanks of a truck, and the marking is inside the product and comprises a chemical composition identifying the secure information, wherein the captured encrypted data relate to a specified event occurring in the supply chain, wherein the collected data from each sensor of the sensors is acquired several times for a predetermined period of time being not more than 30 seconds to obtain, for each sensor, a set of the collected data related to the product, and for each set of the collected data, the collected data from the set is verified as to whether the collected data from the set has essentially the same value, prior to being transferred to the gateway, wherein the data measured by each of the sensors is considered to be correct if the data measured by each of the sensors does not essentially change for the predetermined period of time, and if the collected data from the set is verified to have essentially the same value, the collected data from the set is verified to be correct.

16. The non-transitory computer readable medium according to claim 15, further comprising obtaining supply chain visibility, in an event management platform, using the collected secure data to identify at least one of tampering, diversion, adulteration, counterfeiting, fraud and tax fraud of a product in the supply chain.

17. The non-transitory computer readable medium according to claim 16, wherein the repository system communicates with the event management platform via a network and includes a plurality of storage devices accessible by and distributed among the system.

18. The non-transitory computer readable medium according to claim 15, wherein the composition has compounds with luminescent properties in the range of at least one of UV, IR and Near IR and mixtures thereof which may represent a chemical key.

19. The non-transitory computer readable medium according to claim 15, wherein the product identifier is linked to the marking.

\* \* \* \* \*